US012767027B2

(12) United States Patent
Cabrit et al.

(10) Patent No.: US 12,767,027 B2

(45) Date of Patent: Oct. 20, 2026

(54) SHAPE-MEMORY ALLOY ACTUATOR ASSEMBLY

(71) Applicant: LEAR CORPORATION, Southfield, MI (US)

(72) Inventors: Olivier Cabrit, Hallbergmoos (DE); Anders Groenhage, Mullsjö (SE); Georgiana Tirca-Dragomirescu, Hallbergmoos (DE); Tomas Velasquez, Hallbergmoos (DE); Florian Weinzierl, Hallbergmoos (DE)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 18/959,758

(22) Filed: Nov. 26, 2024

(65) Prior Publication Data

US 2025/0196747 A1 Jun. 19, 2025

Related U.S. Application Data

(60) Provisional application No. 63/609,940, filed on Dec. 14, 2023.

(51) Int. Cl.

*B60N 2/66* (2006.01)
*B60N 2/90* (2018.01)
*F03G 7/06* (2006.01)

(52) U.S. Cl.

CPC ............ *B60N 2/976* (2018.02); *B60N 2/665* (2015.04); *F03G 7/0614* (2021.08)

(58) Field of Classification Search

CPC ........ B60N 2/976; B60N 2/665; B60N 2/914; B60N 2/66; F03G 7/0614; F03G 7/0631; F03G 7/06143; F03G 7/06145; F03G 7/06; F03G 7/066; F03G 7/065; F03G 7/0635; F03G 7/0636; F03G 7/067

See application file for complete search history.

(56) References Cited

U.S. PATENT DOCUMENTS

| | | | | |
|---|---|---|---|---|
| 6,247,678 | B1 * | 6/2001 | Hines | F16K 31/025 60/527 |
| 10,290,879 | B2 * | 5/2019 | Ostadi | H01M 8/2465 |
| 11,635,154 | B2 * | 4/2023 | Beuschel | B60N 2/643 297/284.1 |
| 11,781,669 | B1 * | 10/2023 | Wen | F16K 31/528 251/11 |
| 11,953,114 | B2 * | 4/2024 | Zeng | F16K 31/025 |
| 11,982,369 | B2 * | 5/2024 | Wen | F16K 27/003 |
| 2017/0015222 | A1 * | 1/2017 | Dankbaar | B60N 2/976 |

(Continued)

*Primary Examiner* — Dapinder Singh

(74) *Attorney, Agent, or Firm* — Carlson, Gaskey & Olds, P.C.

(57) ABSTRACT

A method and apparatus includes at least one guide movable along a single axis of motion and at least one tip interface associated with the at least one guide, where the at least one tip interface moveable between a first position and a second position. A resilient member biases the at least one tip interface to the second position. A shape-memory alloy actuator moves the at least one tip interface to the first position in response to an electrical input. The shape-memory alloy actuator includes at least one electrical connector. At least one circuit board is connected to the at least one electrical connector, wherein the single axis of motion extends non-perpendicular to a planar surface of the at least one circuit board.

20 Claims, 19 Drawing Sheets

(56) References Cited

U.S. PATENT DOCUMENTS

| | | | | |
|---|---|---|---|---|
| 2018/0038514 | A1* | 2/2018 | Kuszneruk | F16K 99/0044 |
| 2021/0062930 | A1 | 3/2021 | Zamani et al. | |
| 2022/0065233 | A1* | 3/2022 | Yang | F03G 7/0614 |
| 2023/0131889 | A1* | 4/2023 | Sturm | F03G 7/064 251/366 |

* cited by examiner

SHAPE-MEMORY ALLOY ACTUATOR ASSEMBLY

CROSS-REFERENCE RELATED TO APPLICATIONS

This application claims priority to U.S. Provisional Application No. 63/609,940 which was filed on Dec. 14, 2023, and which is incorporated herein by reference.

BACKGROUND

Seats may include lumbar/bolster valves and massage valves that are configured in a valve arrangement. The valves inflate or deflate associated fluid bladders in a seat. The valves are typically arranged in a valve bank and include actuators that are used to open and close the valves. Packaging traditional valve actuators within various seat configurations can be challenging due to their size and complexity.

DETAILED DESCRIPTION

Figure 1:
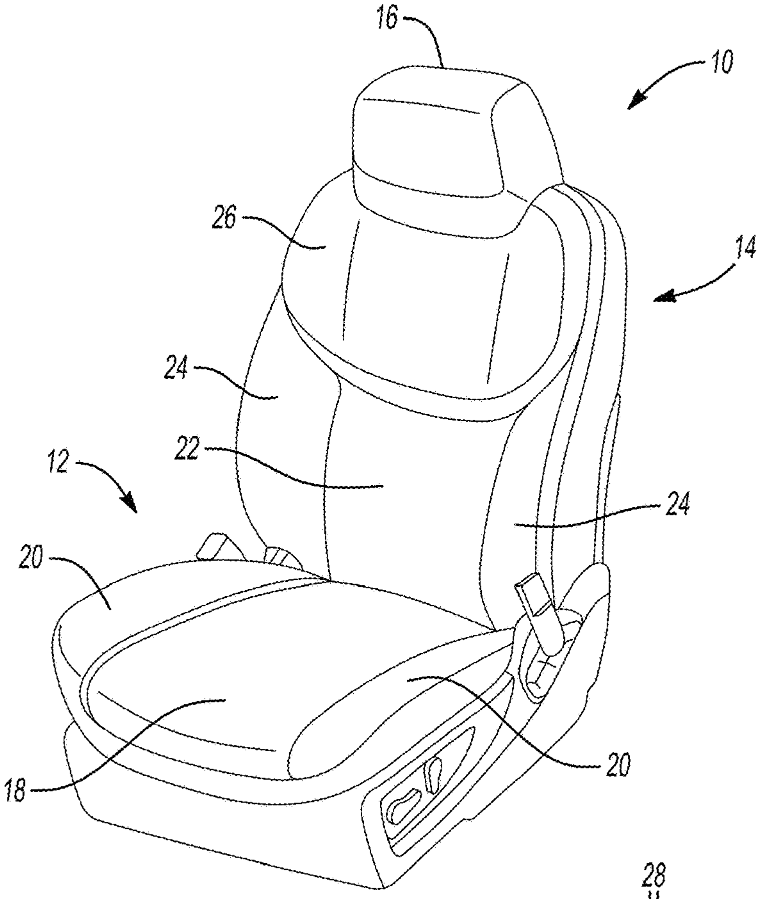
FIG. 1 is a perspective view of an example seat.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

It should be understood that terms such as "about," "substantially," and "generally" are not intended to be boundaryless terms, and should be interpreted consistent with the way one skilled in the art would interpret those terms.

This disclosure relates to a valve actuator that utilizes a shape-memory alloy (SMA) to move a tip interface between open and closed positions.

FIG. 1 illustrates a seat assembly 10 according to one example embodiment. The seat assembly 10 may be utilized as a vehicle seat assembly 10 for seating in a vehicle, such as an automobile, an aircraft, a watercraft, or any other seating environment. The seat assembly 10 includes a seat bottom 12, which may be adapted to be mounted for motor-driven adjustable translation in a fore and aft direction and in an up and down direction of a vehicle. The seat assembly 10 includes a seat back 14, which may be pivotally connected to the seat bottom 12 to extend generally upright relative to the seat bottom 12 for pivotal adjustment relative to the seat bottom 12. A head restraint 16 may also be mounted to the seat back 14.

In one example, the seat bottom 12 includes a central seating surface 18 and a pair of side bolster regions 20 laterally spaced about the central seating surface 18. The seat back 14 includes a pelvic/lumbar seating surface 22 with a pair of laterally spaced apart side bolster regions 24 on either side. A thoracic/shoulder seating surface 26 is provided above the pelvic/lumbar seating surface 22 and the seating surface of seat back side bolster regions 24. It should be understood that this is just one example of a seat configuration, and that other configurations could also be utilized.

Figure 2:
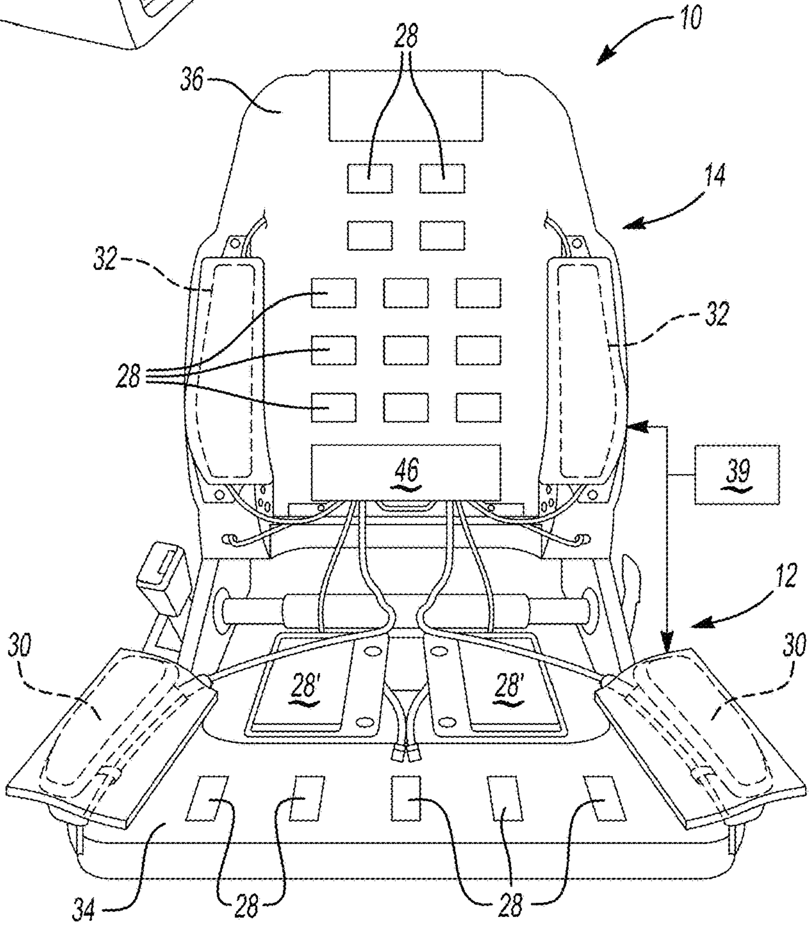
FIG. 2 schematically illustrates some components of a fluid supply system relative to a plurality of fluid bladders.

FIG. 2 illustrates the seat assembly 10 with a cover, trim, and foam removed for revealing underlying components. The seat bottom 12 includes one or more fluid bladder assemblies 28 under the central seating surface 18 and in the seat back 14. The seat bottom 12 also includes a pair of lower side bolster fluid bladder assemblies 30, each located in the seat bottom 12 adjacent the side bolster seating surface 20. Likewise, the seat back 14 includes a pair of upper side bolster fluid bladder assemblies 32, each located adjacent one of the seat back side bolster seating surfaces 24. Each of the side bolster fluid bladder assemblies 30, 32 is supported upon a frame 34, 36 of the corresponding seat bottom 12 and seat back 14.

The side bolster fluid bladder assemblies 30, 32 provide lateral support to a seated occupant when the vehicle experiences a turn or cornering. The fluid bladder assemblies 28 in the seat bottom 12 and in the seat back 14 can be used for lumbar or massage purposes.

The seat assembly 10 also includes an actuator assembly 39 (schematically shown in FIG. 2) for controlling inflation of the bladder assemblies 28, 30, 32. The actuator assembly 39 may include a compressor or pneumatic pump connected to a valve bank to provide a source of fluid to the fluid bladder assemblies 28, 30, 32. A seat control module is provided in the seat bottom 12 or seat back 14 and is identified generally as a controller 46. In one example, the controller 46 regulates compressed air into and out of the bladder assemblies 28, 30, 32 via the actuator assembly 39. The controller 46 and actuator assembly 39 may be installed in the seat back 14, as shown, or installed under the seat, or anywhere suitable in the vehicle. Further, the controller 46 and actuator assembly 39 may be separate units or may be combined together as a single unit.

The controller 46 may include a processing unit and non-transitory memory for executing various control strategies. The processing unit can be a custom made or commercially available processor, a central processing unit (CPU), or generally any device for executing software instructions. The memory can include any one or combination of volatile memory elements and/or nonvolatile memory elements. The processing unit can be programmed to execute one or more programs stored in the memory. The programs may be stored in the memory as software code, for example. The programs stored in the memory may include one or more additional or separate programs, each of which includes an ordered list of executable instructions for implementing logical functions associated with controlling the valve bank. While shown as a single controller, the controller 46 may be comprised of one or more controllers. The controller 46 may also be in communication with, and responsive to instructions from, another controller.

Figure 3:
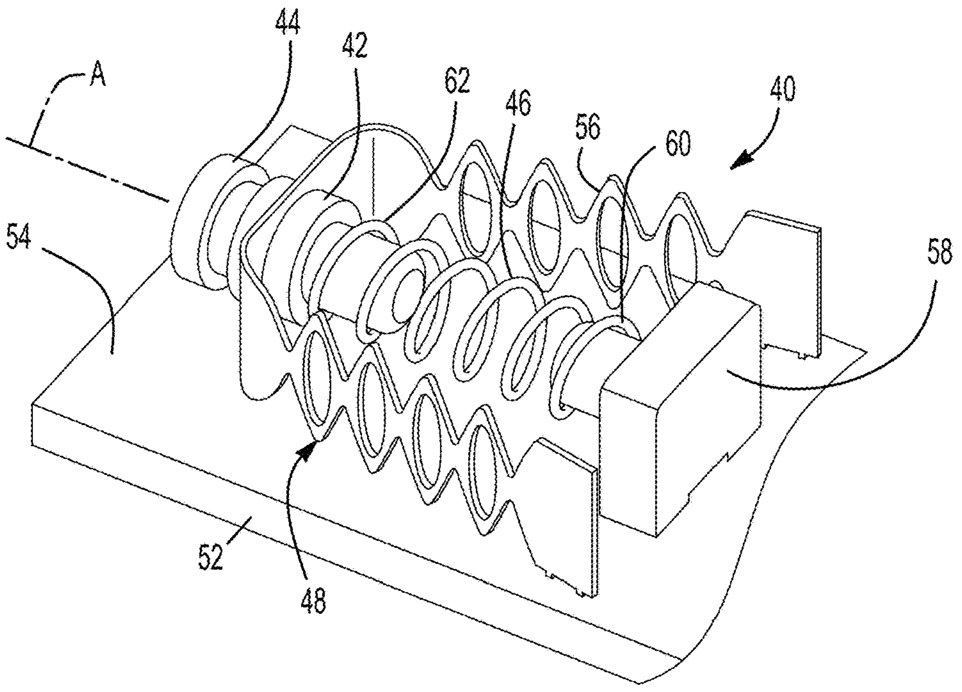
FIG. 3 is a perspective view of one example variant of a SMA actuator assembly.
Figure 4:
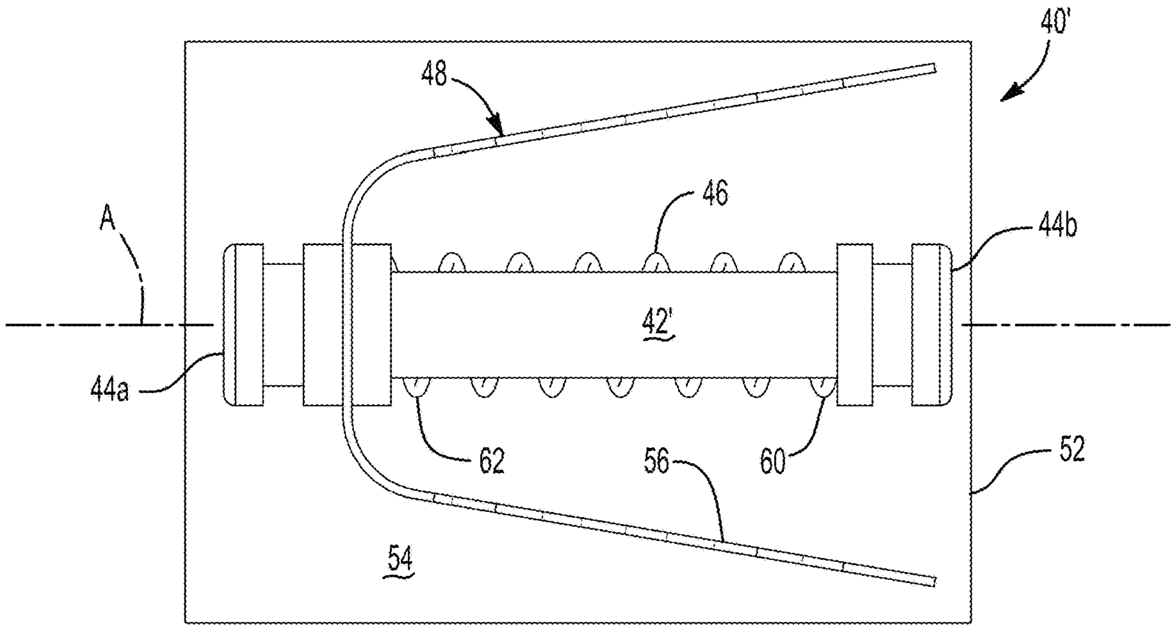
FIG. 4 is a perspective view of another example variant of a SMA actuator assembly.
Figure 5A:
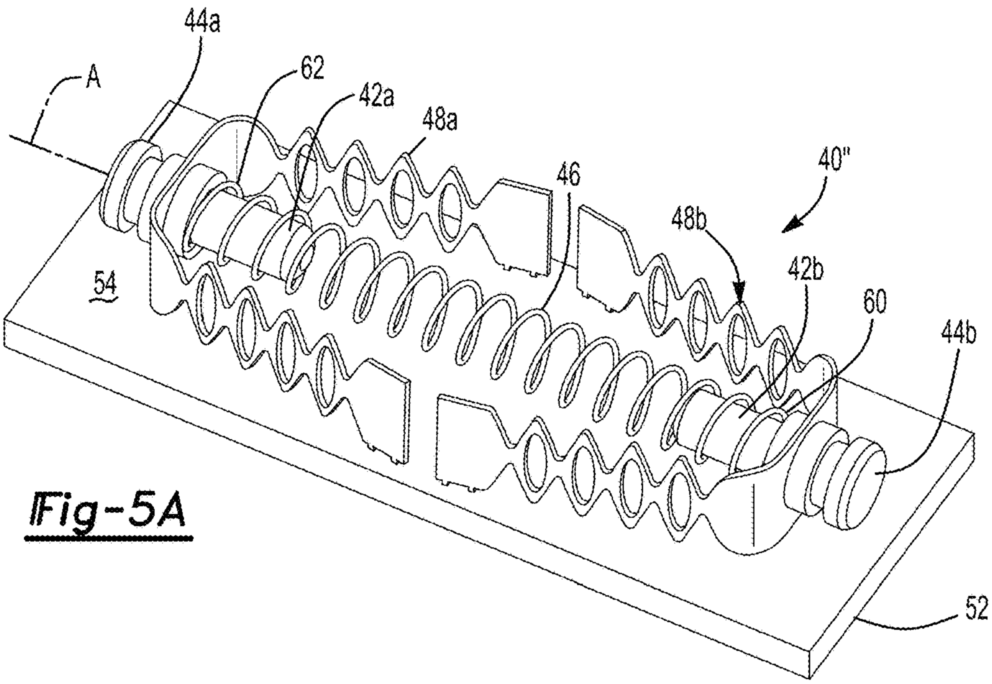
FIG. 5A is a perspective view of another example variant of a SMA actuator assembly.
Figure 5B:
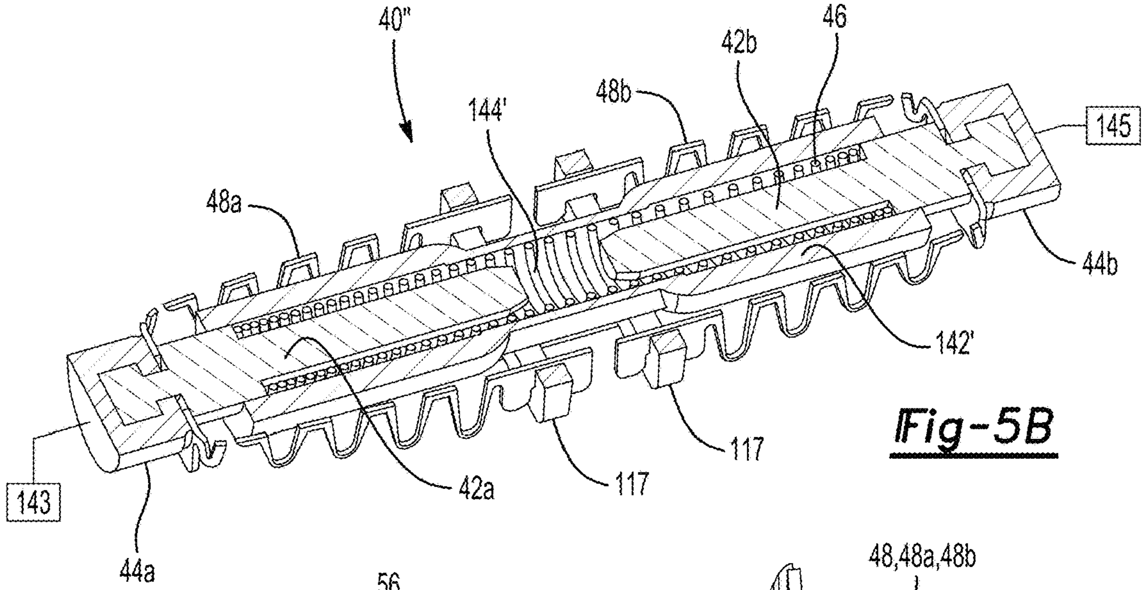
FIG. 5B is a section view of the variant of FIG. 5A as associated with a fluid circuit.

FIGS. 3, 4, and 5A-5B show different examples of SMA actuators that can be used to control fluid flow into a fluid bladder. FIG. 3 shows a single actuator that performs one function, FIG. 4 show a single actuator that performs two functions, and FIGS. 5A-B shows a dual actuator. Further, while these actuators are shown as being associated with a pneumatic seat system, the actuators could also be used as closure members for a glove box mechanism, quick releases, or for heat recovery systems.

As shown in FIG. 3, an actuator assembly 40 includes at least one guide 42 that is movable along a single axis of motion A, and at least one tip interface 44 associated with the guide 42. The tip interface 44 is selectively moveable between a first position, e.g. a closed/extended position, and a second position, e.g. an open/contracted position. In one example, the guide 42 comprises a plunger or other linear moveable guide element that ensures the linear motion of the functional engagement surface, i.e. the tip interface 44. In one example, the tip interface 44 comprises a valve tip or valve head that is capable of sealing against an associated valve seat. In another example, the tip interface comprises a linear closure or release member. A resilient member 46, such as a spring biasing element for example, e.g. a coil spring, biases the tip interface 44 to the closed/extended position. At least a portion of the resilient member 46 is configured to surround the guide 42 to provide guiding from inside the resilient member and to prevent buckling. In some configurations, the guide 42 extends along an entire length of the resilient member 46, while in other configurations a guide 42 is only provided within one or both of the ends of the resilient member.

The actuator assembly 40 further includes a SMA actuator 48 that moves the tip interface 44 to the open/retracted position in response to an electrical input. As known, the internal structure of SMA material, e.g., alloy of nickel and titanium, changes depending on the temperature and applied mechanical stress. In one example, the electrical input that is provided to the SMA actuator 48 comprises a potential difference, e.g., an electrical current, that is applied to heat the SMA material via Joule heating to cause the SMA material to contract when the SMA material reaches a temperature of activation. The SMA actuator 48 includes at least one electrical connector 50 that can be associated with a power connection interface. When the SMA actuator 48 is contracted via the powered electrical input, the tip interface 44 is moved to the open position. When the powered electrical input is turned off or deactivated, the SMA actuator 48 recovers its original shape due to the resilient member 46.

With regard to the source of activation, the examples shown are prepared for electrical input, e.g., Joule heating. However, it should be understood that any source that generates heat, e.g., electrical, convection, radiation, conduction, could be used for activation purposes.

The actuator assembly 40 further includes at least one circuit board 52 connected to the at least one electrical connector 50. In one example, the circuit board 52 is a printed circuit board comprising a non-conductive material with conductive lines/traces printed or etched on the board, wherein electronic components are mounted on the board and the traces connect the components together to form a working circuit or assembly in a known manner. The circuit board 52 interfaces with a main circuit board and CPU/controller 46 to control the electrical power delivered to the actuator assembly 40. In one example, the electrical connector 50 comprises a male electrical connector, e.g., a pin or leg extension, which provides an electrical contact extension that is received within a circuit board receptacle provided by the circuit board 52 to ensure a reliable physical and electrical connection. As shown in FIG. 3, the single axis of motion A extends non-perpendicular, e.g. parallel, to a planar surface 54 of the circuit board 52. This arrangement provides a significantly more compact configuration as compared to traditional configurations, while also reducing an overall number of components required for the actuator assembly 40.

In one example, the SMA actuator 48 comprises an accordion shaped body 56 wherein alternating shaped segments, e.g. ring-shaped segments, are connected together at a single connection point. The SMA actuator 48 may also have other body shapes and or configurations, which will be discussed in greater detail below. In one example, the accordion shaped body 56 is cut from a SMA sheet of material via a laser-cutting or other similar process. Any type of SMA material can be used to form the SMA actuator body. In another example, the processing of the SMA component can be accomplished via stamping/microstamping or sputtering.

In one example, the actuator assembly 40 further includes a spring support 58. The spring support 58 may be held fixed relative to the circuit board 52 or other fixed structure. In one example, the fixed spring support 58 is associated with a first end 60 of the resilient member 46, and a second end 62 of the resilient member 46 is supported by, and fixed for movement with, the tip interface 44.

In one example, the tip interface 44 is tied/responsive to the actuator motion of the SMA actuator 48. In the example of pneumatic valves, the tip interface 44 comprises seal-tip/valve interface 44. In one example, the seal-tip/valve interface 44 is associated with a fluid bladder for a seat as described above in FIGS. 1-2.

FIG. 4 shows a second variant of an actuator assembly 40' that is similar to the actuator assembly 40 of FIG. 3, but includes a guide 42' that is movable along a single axis of motion A, and which includes a first tip interface **44*a* at one end and a second tip interface 44*b* at an opposite end. The guide 42' is selectively moveable between a first position, e.g. a closed/extended position, and a second position, e.g. an open/contracted position. In one example, the guide 42' comprises a plunger or other linear moveable guide element that ensures the linear motion of the functional engagement surfaces, i.e. the tip interfaces 44*a*, 44*b*. In one example, the tip interfaces 44*a*, 44*b* comprise a valve tip or valve head that is capable of sealing against an associated valve seat. In another example, the tip interfaces 44*a*, 44*b*** comprise a linear closure or release member.

The resilient member 46 comprises a single spring member that surrounds the guide 42' and reacts against the fixed spring support 58 (FIG. 8) to bias one of the tip interfaces **44*a*, 44*b* to a closed/extended position. In the configuration of FIG. 4, the single guide 42' performs two simultaneous functions. For example, the resilient member 46 can be configured to bias the first tip interface 44*a* to a first/closed/extended position, which would necessarily have the second tip interface 44*b* in a second position, e.g., an open position. When the SMA material is activated, the SMA actuator 48 contracts and moves the first tip interface 44*a* to the second/open/contracted position, which would necessarily have the second tip interface 44*b*** in the first position, e.g., a closed position.

Figure 8:
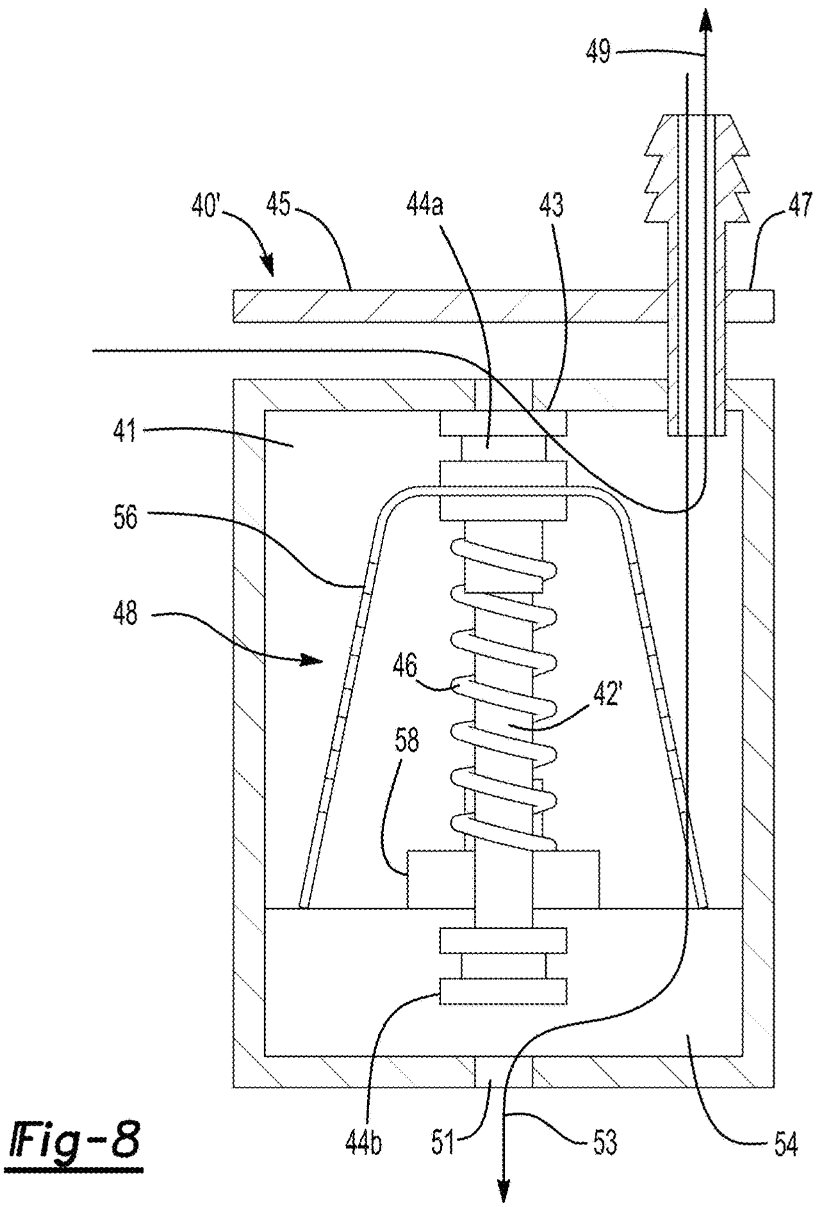
FIG. 8 is a top view of the variant of FIG. 4 as associated with a fluid circuit.

An example of this is shown in FIG. 8 where the actuator assembly 40' is mounted within a chamber 41 having an inlet 43 associated with a fluid rail 45, a first outlet 47 associated with a first fluid circuit 49, and a second outlet 51 associated with a second fluid circuit 53. The fluid rail 45 is in fluid communication with a fluid supply and/pump in a known manner. In one example, the first fluid outlet 47 is associated with a connector 55 that feeds into a fluid bladder 28, 30, 32 (FIG. 2), and the second fluid outlet comprises an exhaust outlet. In one example, the resilient member 46 biases the first tip interface **44*a* to a first/closed/extended position as shown in FIG. 8, and the second tip interface 44*b* is in a second position, e.g., an open position. This prevents fluid from the fluid rail 45 from entering the inlet 42 and allows fluid to be exhausted from the bladder to the second outlet 51 as indicated by the second fluid circuit 53. When the SMA material is activated, the SMA actuator 48 contracts and moves the first tip interface 44*a* to the second/open/contracted position, which would necessarily have the second tip interface 44*b* in the first position, e.g., a closed position, to prevent fluid from exiting the second fluid outlet 51. This allows fluid from the fluid rail 45 to enter through the inlet 42 and then enter the first outlet 47, flow through the connector 55, and enter the bladder (see flow path of the first fluid circuit 49**).

In one example, the actuator assembly 40' includes a guide sleeve 142 that surrounds a guide 42' and supports the SMA actuator 48. The guide sleeve 142 has an internal cavity 144 that defines the single axis of motion A along a guide path. The guide 42' is at least partially received within the guide sleeve 142 and is movable along the guide path. The guide sleeve 142 supports the SMA actuator 48 for movement along the single axis of motion A. The resilient member 46 is supported within an open area formed between the guide 42' and the guide sleeve 142. Thus, the resilient member 46 is fully covered and protected.

The guide 42' has the first tip interface 44*a* at one end that interfaces with a first fluid circuit 63 and has the second tip interface 44*b* at an opposite end that interfaces with a second fluid circuit 65. As discussed above, when one circuit 63, 65 is open, the other circuit 63, 65 is closed and vice-versa.

FIGS. 5A-5B show another variant of an actuator assembly 40" that includes dual guides, i.e. a first guide 42*a* and a second guide 42*b*. Each guide 42*a*, 42*b* is movable along the single axis of motion A. The first guide 42*a* includes a first tip interface 44*a* and the second guide 42*b* includes a second tip interface 44*b*. The first guide 42*a* includes a first SMA actuator 48*a* and the second guide 42*b* includes a second SMA actuator 48*b*. Each guide 42*a*, 42*b* is selectively and independently moveable between a first position, e.g. a closed/extended position, and a second position, e.g. an open/contracted position. In one example, each guide 42*a*, 44*b* comprises a plunger or other linear moveable guide element that ensures the linear motion of the respective functional engagement surfaces, i.e. the tip interfaces 44*a*, 44*b*. In one example, the tip interfaces 44*a*, 44*b* each comprise a valve tip or valve head that is capable of sealing against an associated valve seat. In another example, the tip interfaces 44*a*, 44*b* each comprise a linear closure or release member.

FIG. 5B shows another actuator configuration associated with a fluid circuit. In this example, the actuator assembly 40" includes a guide sleeve 142' that surrounds a first guide 42*a* and a second guide 42*b*. The guide sleeve 142' also provides support for the SMA actuator 48, which comprises a first SMA actuator 48*a* and a second actuator 48*b*. The guide sleeve 142' has an internal cavity 144' that defines the single axis of motion A along a guide path. The guides 42*a*, 42*b* are at least partially received within the guide sleeve 142' and are movable along the guide path. The guide sleeve 142' supports the SMA actuators 48*a*, 48*b* for movement along the single axis of motion A. In one example, the guide sleeve 142' provides a mechanical support 117 for distal end portions of the SMA actuators 48*a*, 48*b*. The mechanical support 117 comprises arm extensions from the guide sleeve 142' facilitates the assembly of the SMA body for pushing the electrical connectors 50 into the corresponding openings in the circuit board 52, while also serving to stabilize movement of the actuator.

The first tip interface 44*a* is associated with a first fluid circuit 143 and the second tip interface 44*b* is associated with a second fluid circuit 145. Movement of the tip interfaces 44*a*, 44*b* is controlled by activation of the SMA actuators 48*a*, 48*b* and the resilient member 46 to open/close the fluid circuits. The tip interfaces 44*a*, 44*b* can be moved simultaneously or separately/independently of each other. The resilient member 46 is supported within an open area formed between the guides 42*a*, 42*b* and the guide sleeve 142'. Thus, the resilient member 46 is fully covered and protected.

The resilient member 46 comprises a single spring member that is associated with both guides 42*a*, 42*b*. In the configuration of FIGS. 5A-B, each guide 42*a*, 42*b* performs its own function but only a single resilient member 46 is needed for both guides 42*a*, 42*b*. For example, the resilient member 46 can be configured to bias the both the first tip interface 44*a* to a first/closed/extended position and the second tip interface 44*b* to a first/closed/extended position. When the SMA material is activated for the first guide 42*a*, the first SMA actuator 48*a* contracts and moves the first tip interface 44*a* to a second/open/contracted position. When the SMA material is activated for the second guide 42*b*, the second SMA actuator 48*b* contracts and moves the second tip interface 44*b* to a second/open/contracted position. The guides 42*a*, 42*b* can be moved in conjunction, e.g., in unison, with each other or can be controlled separately/independently of each other.

It should be noted that in each variant, the linear movement of the actuator assembly 40, 40', 40" is along the single axis of motion A in a direction that is non-perpendicular to the planar surface 54 of the circuit board 52. Further, each variant only requires a single resilient member 46. Each variant may also use a single circuit board 52. Finally, a single common body type for the SMA actuator 48, 48*a*, 48*b* can be used for each variant.

Figure 6A:
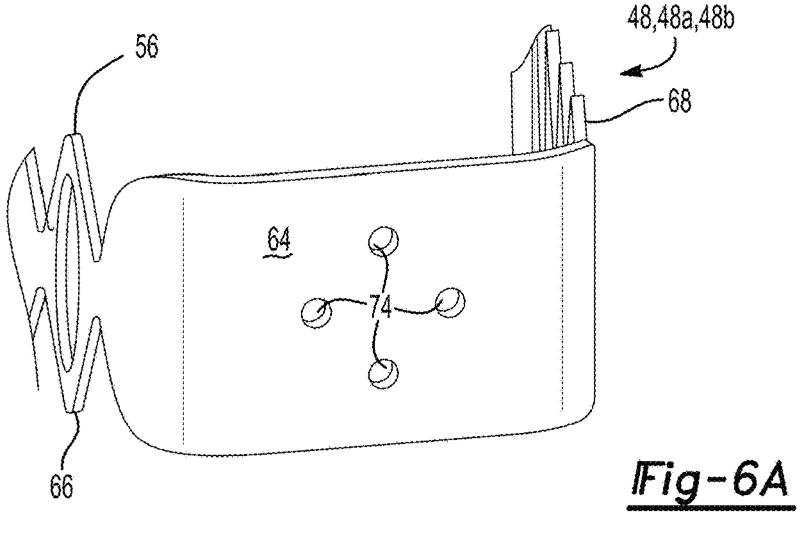
FIG. 6A is a perspective view of a SMA actuator body as used in the variants of FIGS. 3-5.
Figure 6B:
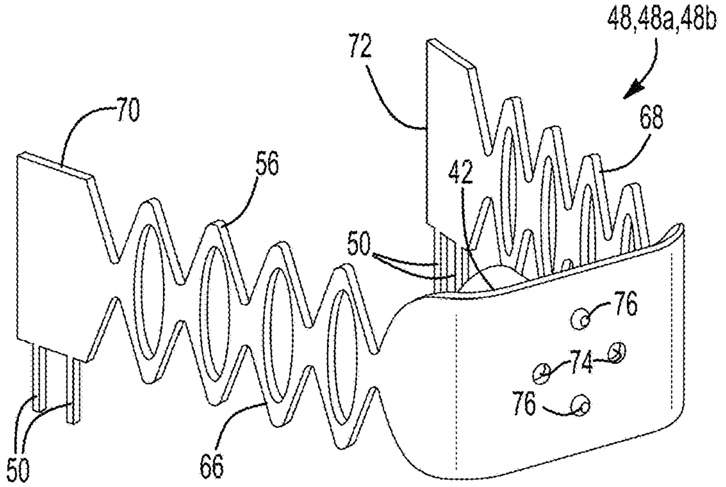
FIG. 6B is a view similar to FIG. 6A but additionally shows a connection interface to a guide of the actuator assembly.
Figure 6C:
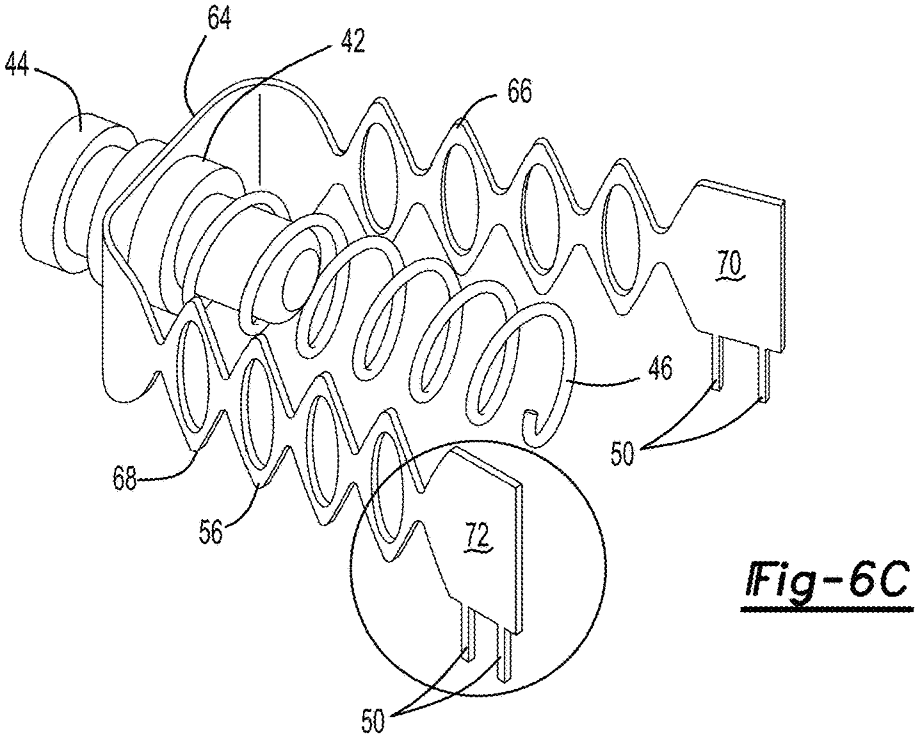
FIG. 6C is a perspective view of a tip interface from the SMA actuator assembly.

FIGS. 6A-6B show an example of the accordion shaped body 56 of the SMA actuator 48, 48*a*, 48*b*. The accordion shaped body 56 comprises center pad portion 64, which is associated with a respective guide 42, 42*a*, 42*b* and respective tip interface 44, 44*a*, 44*b*. The accordion shaped body 56 further includes first 66 and second 68 accordion legs on opposing sides of the center pad portion 64. The first accordion leg 66 extends to a distal end comprising a first connector pad 70, and the second accordion leg 68 extends to a distal end comprising a second connector pad 72. Each of the connector pads 70, 72 includes one or more electrical connectors 50 to connect to the circuit board 52. In the example shown, each connector pad 70, 72 includes a pair of electrical connectors 50; however, other connector configurations could also be used.

In one example, the accordion shaped body 56 is comprised of alternating shaped segments 67, e.g. ring-shaped segments, are connected together at a single connection portion 69 (see FIG. 6B). In one example, the shaped segments 67 are identical to each other. In one example, the connection portions 69 comprise a narrow neck or waist portion. The height of the connection portions 69 is significantly less than the height of the shaped segments 67.

In one example, the center pad portion 64 includes one or more cut-outs 74 that are associated with at least one of a respective guide 42, 42*a*, 42*b* and respective tip interface 44, 44*a*, 44*b*. In one example, the cut-outs comprise a first set of cut-outs to couple the SMA actuator 48 to one of the guides 42 and a second set of cut-outs to couple the SMA actuator 48 to the tip interface 44. In the example shown, there are four cut-outs with two cut-outs associated with the guide and two cut-outs associated with the tip interface; however, fewer or additional cut-outs can be used as needed.

The cut-outs 74 extend through an entire thickness of the center pad portion 64 and are shown as having a circular shape; however, other shapes may also be used. FIG. 6B shows an example where the guide 42 includes a pair of protrusions 76 that are received within a pair of cut-outs 74 to couple the guide 42 to the SMA actuator 48, 48*a*, 48*b* such that the guide can facilitate controlling the linear motion of the actuator assembly.

Figure 6D:
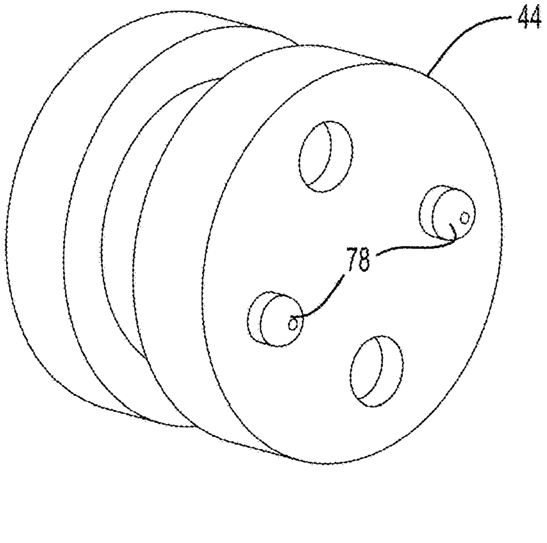
FIG. 6D is a view similar to FIG. 6B but additionally shows a connection interface to a tip interface of the actuator assembly.
Figure 6E:
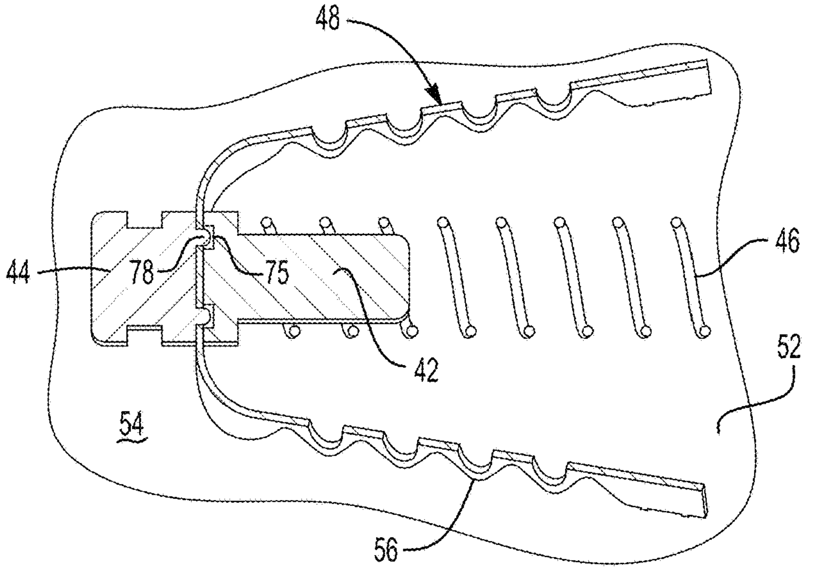
FIG. 6E is a longitudinal section view of a connection interface between the SMA material, tip interface, and guide.
Figure 6F:
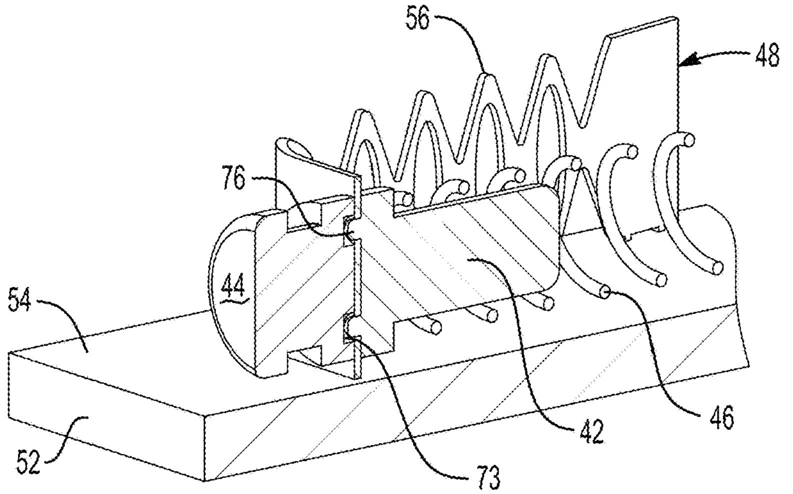
FIG. 6F is a vertical section view of a connection interface between the SMA material, tip interface, and guide.

FIG. 6D shows a perspective view of the tip interface 44 that shows an attachment interface to the SMA actuator 48. The tip interface 44 includes one or more protrusions 78 that fit into the second set of cut-outs 74. The tip interface 44 also includes depressions/recesses 73 that align with the protrusions 76 in the guide 42. FIG. 6E shows a section view of the protrusions 78 of the tip interface 44 that fit into corresponding depressions/recesses 75 in the guide 42. FIG. 6F shows a section view of the protrusions 76 of the guide 42 that fit into the corresponding depressions/recesses 73 of the tip interface 44.

FIGS. 6E-6F show an assembled combination of the accordion shaped body 56, guide 42, and tip interface 44, wherein the assembly is connected to the circuit board 52. The guide 42 assembles into the first set of cut-outs 74 from one side of the center pad portion 64 and the tip interface 44 assemblies into the second set of cut-outs 74 from an opposite side of the center pad portion 64. Thus, the center pad portion 64 is sandwiched between the guide 42 and tip interface 44 such that the SMA accordion body 56, guide 42, and tip interface 44 move together along a linear path, i.e. along a single axis of motion A, as a single unit as best shown in FIG. 7.

Figure 6G:
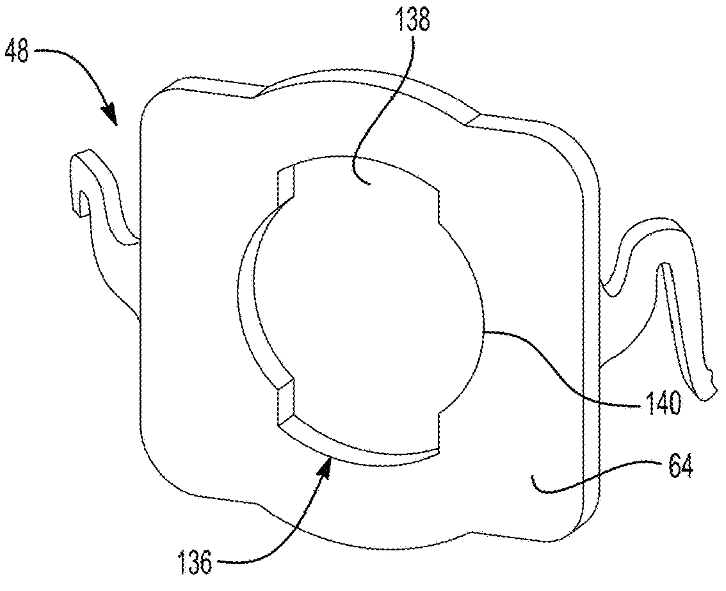
FIG. 6G is a perspective view of a pad with a non-circular cut-out.

FIG. 6G shows an example of a pad 64 with a cut-out opening 136 has a non-circular cut-out shape where the cut-out profile varies dimensionally about the linear axis of motion A. In one example, the cut-out opening 136 comprises an elongated slot 138 with an enlarged center portion 140.

Figure 7:
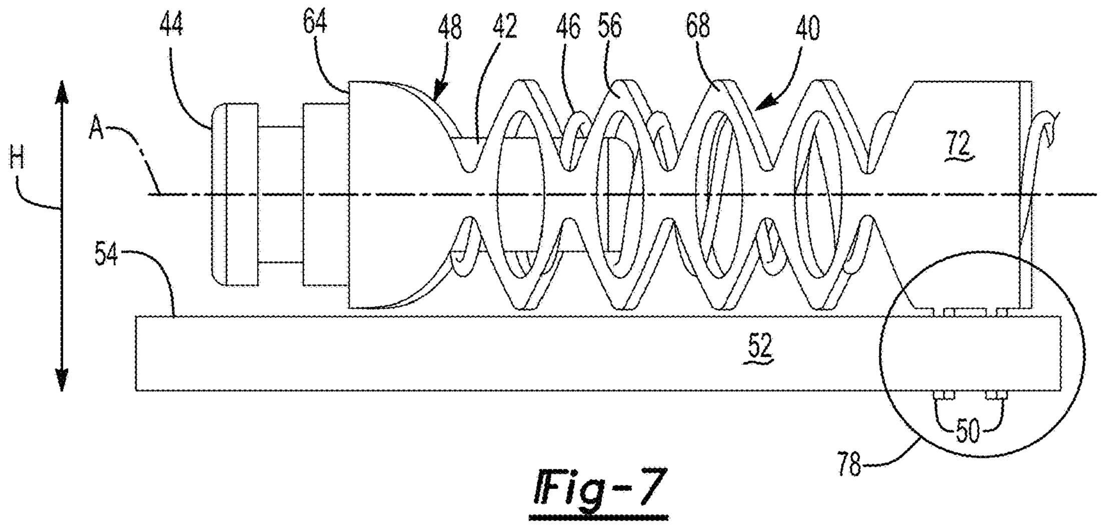
FIG. 7 is a side view of the variant of FIG. 3.

In addition, FIG. 7 provides a side view that emphasizes the compactness of the design. The entire actuator assembly 40 is aligned to extend along the circuit board 52 such that an overall height H is relatively small as compared to traditional designs. The guide 42, tip interface 44, resilient member 46, and SMA actuator 18 all are centered lengthwise to extend along the axis to provide the compact configuration. Further, the electrical connectors 50 are rotated to extend outward from a respective edge of the connector pads 70, 72 in a direction toward the planar surface 54 of the circuit board 52 to further facilitate a compact configuration. In one example, the electrical connectors 50 extend in a direction that is non-parallel to the axis of motion A. In one example, the electrical connectors 50 extend from an edge surface of the connector pads 70, 72 that faces the circuit board 52.

In one example, the electrical connectors 50 are formed as part of the SMA actuator 48, i.e. the electrical connectors 50 are cut from the sheet of SMA material to be integrally formed with the SMA actuator 48. Optionally, the electrical connectors 50 may be separately attached.

In one example, the electrical connectors 50 are connected directly to the circuit board 52 at a connection interface 79 that comprises a mechanical locking interface such as a press-fit interface, for example.

Figure 9:
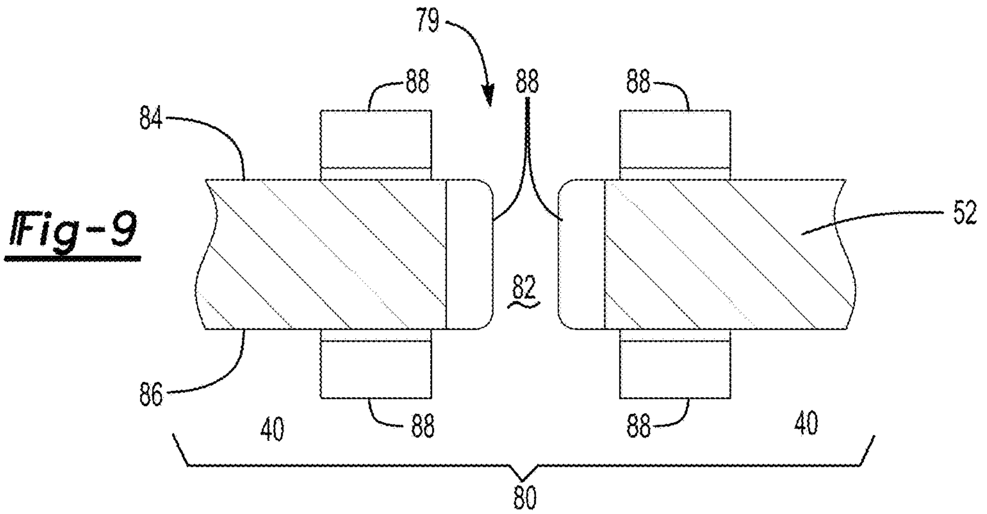
FIG. 9 shows a schematic representation of an electrical connection interface for a circuit board.
Figure 10:
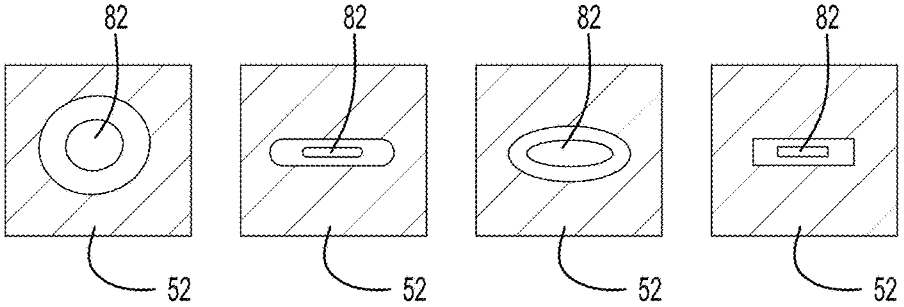
FIG. 10 shows different examples of openings in the circuit board at the electrical connection interface.

In one example, the connection interface 79 to connect the electrical connectors 50 to the circuit board 52 comprises one or more electrical contacting zones 80 as shown in FIG. 9. For each zone 80, the circuit board 52 has a hole 82 that extends through a thickness of the circuit board 52 from an A-side 84 to a B-side 86. The zones 80 include contacts 88 that can be either on the A-side 84, B-side 86, or in the hole 82. As shown in FIG. 10, the hole 82 can be a round hole, can be a slit, oblong, or any other shape.

Figure 11A:
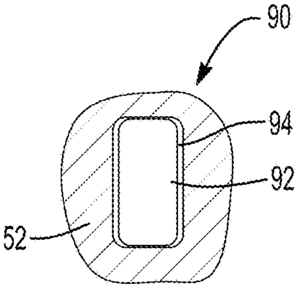
FIGS. 11A-B show one example of a press-fit connection.
Figure 11B:
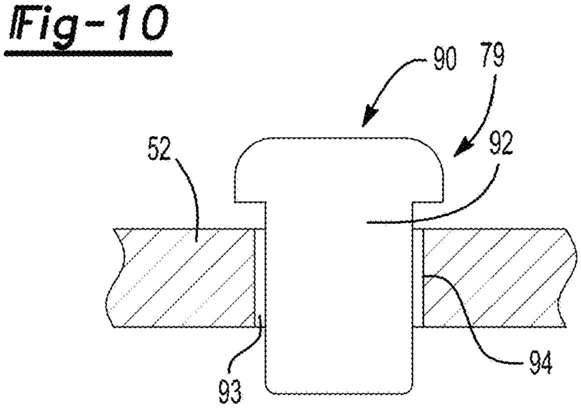

Additionally, in one example, the SMA actuator 48 can be inserted through the circuit board 52 at an SMA connection interface 90 for positioning purposes only. Additionally, specified portions 92 of the SMA actuator 48 can inserted through the circuit board 52 at selected location to remove some degrees of freedom in the assembly. As shown in FIGS. 11A-B, the connection interface 90 comprises an opening 94 that provides a tight tolerance, e.g., small gap, between the inner surface defining opening 94 and the outer surface of the portion 92 of the SMA actuator 94. In one example, the portions 92 of the SMA body material extend outwardly of the SMA body as legs or fingers that can have any cross-sectional shape. The opening 94 can also have any shape. In one example, cross-sectional shape of the portions 92 and the shape of the opening 94 are different from each other to further facilitate a close fit.

The press-fit connection interface 79 to connect the electrical connectors 50 to the circuit board 52 can be done in various manners. In each configuration, there are one or more electrical connectors 50 that extend downwardly from the SMA actuator 48 and each connection is assembled/connected in one linear motion. As described above, each actuator assembly 40 is moveable along a single axis of motion A that extends non-perpendicular to the planar surface 54 of the circuit board 52. Each electrical connector 50 extends in a direction that is non-parallel, e.g. transverse or perpendicular, with the axis of motion A.

Figure 12A:
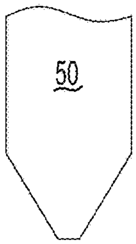
FIGS. 12A-B show another example of a press-fit connection.
Figure 12B:
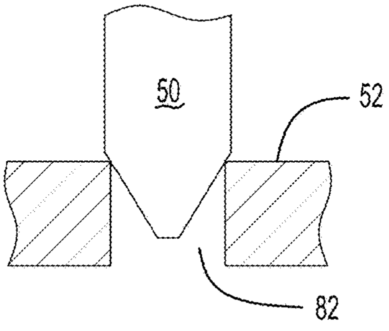

In one example shown in FIGS. 12A-B, a distal end of the connector 50 includes a chamfer 95 that fits in the hole 82 or slit in the circuit board 52. During the assembly, the chamfer of the connector 50 is designed in a way to self-position the connector 50 accurately in a center of the hole 82.

Figure 13A:
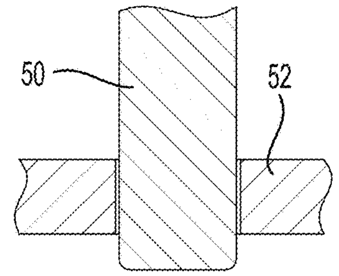
FIGS. 13A-C show another example of a press-fit connection.
Figure 13B:
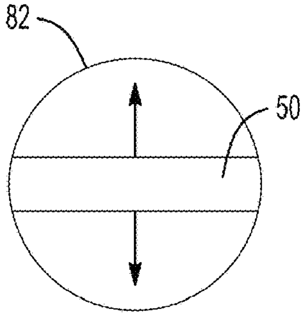
Figure 13C:
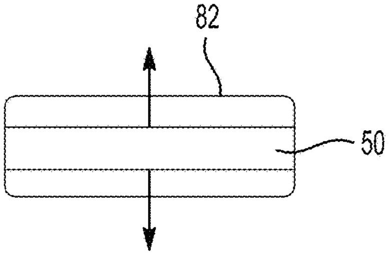

In examples shown in FIGS. 13A-C, the distal end of the connector 50 comprises a plain pin that deforms sideways to adjust in the hole 82 or slit. The retention of the pin in the hole 82 is obtained by mechanical contact and friction as the deformable pin expands to fill the hole after insertion.

Figure 14A:
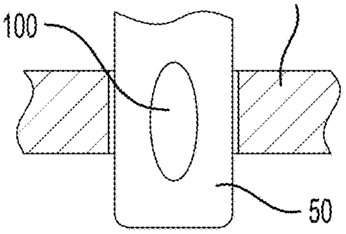
FIGS. 14A-H show additional examples of press-fit connections.
Figure 14B:
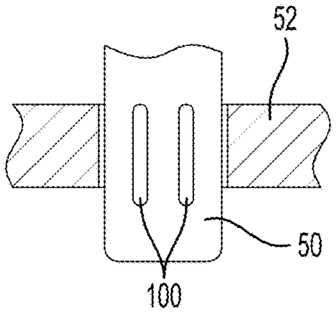
Figure 14C:
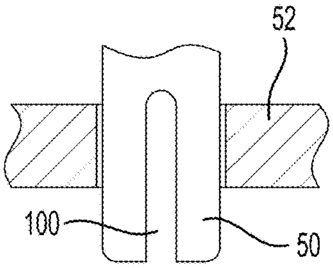
Figure 14D:
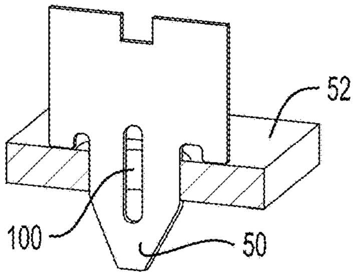
Figure 14E:
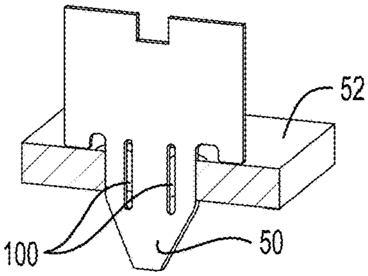
Figure 14F:
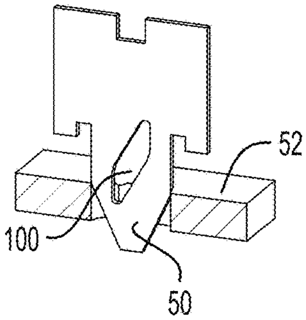
Figure 14G:
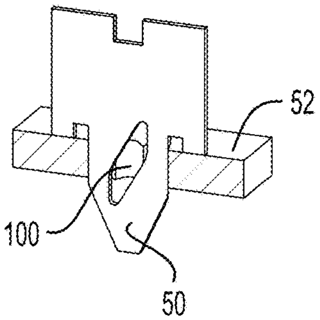
Figure 14H:
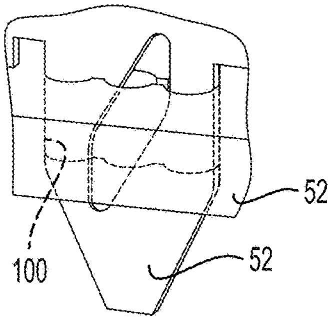

In examples shown in FIGS. 14A-C, the distal end of the connector 50 comprises a plain pin with a cut out portion 100, e.g., a hole, fork, etc. The cut out portion 100 can be one or more shapes providing a degree of freedom for the pin to deform during insertion into the hole 82. The shapes can have any profile and can vary in size to provide a desired amount of deformation during assembly.

In an example shown in FIGS. 14D-H, the connector 50 comprises a pin body with a chamfer 95. In an example shown in FIGS. 14D-E, the cut out portion 100 comprises a one or more vertical slots that are formed within the pin body above the chamfer 95. In an example shown in FIGS. 14F-H, the cut out portion 100 comprises one or more slots extending at an angle relative to the direction of insertion.

Figure 15A:
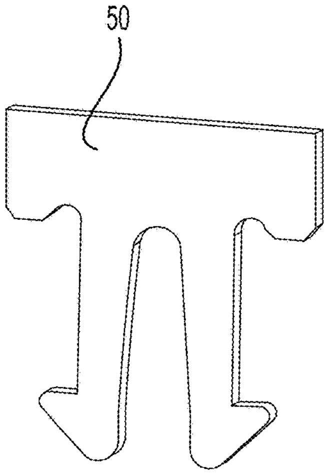
FIGS. 15A-D show additional examples of press-fit connections.
Figure 15B:
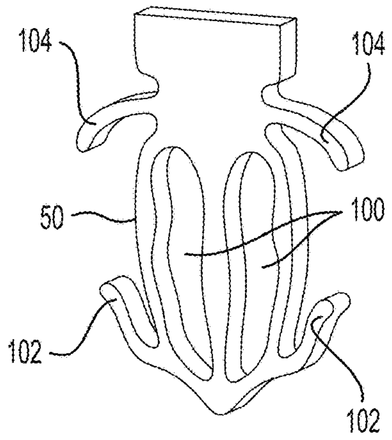
Figure 15C:
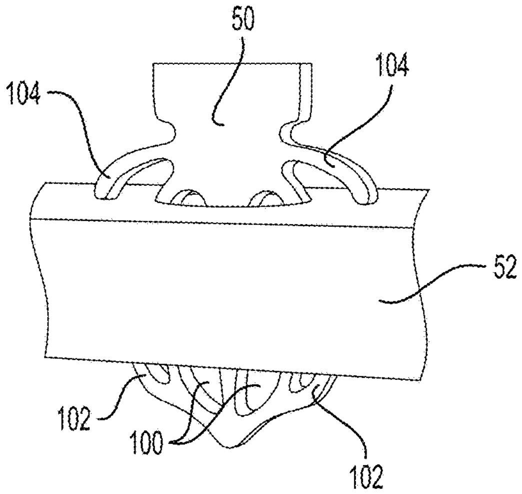
Figure 15D:
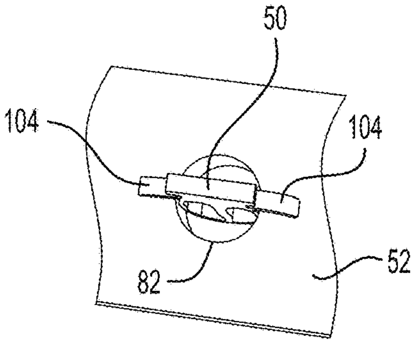

In examples shown in FIGS. 15A-D, the electrical connector 50 is configured to provide an anchor system. This provides for one-way insertion where the electrical connector 50 is locked in both directions, e.g. insertion and withdrawal directions, after insertion. The electrical connector 50 comprises a pin body with a cut out portion 100 that forming two legs 99, which are inserted into the hole 82 and compressed during insertion due to the deformable properties of the SMA material. The distal end of the electrical connector 50 includes a first set of protrusions, grips, or hooks 102 that grip an underside of the circuit board 52 once installed as shown in FIG. 15A. FIGS. 15B-D show a configuration where the electrical connector 50 comprises a pin body with multiple cut out portions 100, and which further includes a second pair of legs 104 that grip a top side of the circuit board 52 once installed. As the electrical connector 50 is inserted the first set of legs 102 pop out at the underside of the circuit board 52 to self-lock the electrical connector 50 in a vertical direction. The second set of legs 104 prevents the electrical connector 50 from being over-inserted into the hole 82.

Figure 16A:
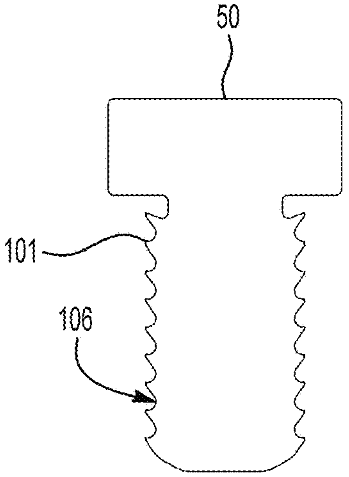
FIGS. 16A-C show additional examples of press-fit connections.
Figure 16B:
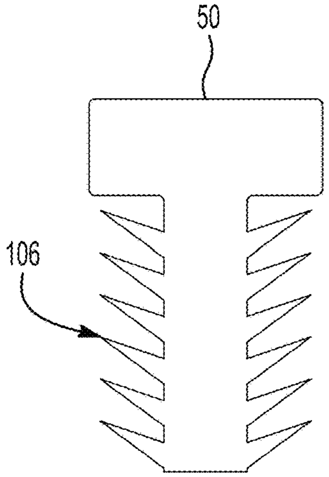
Figure 16C:
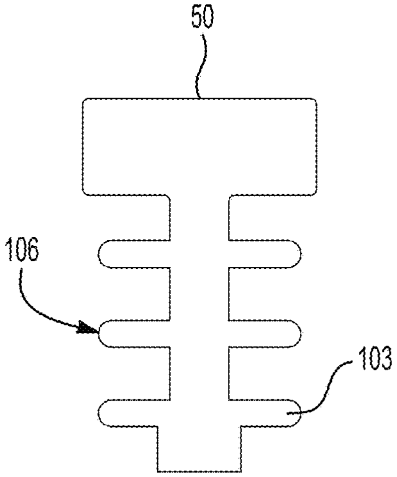

In examples shown in FIGS. 16A-C, there is an elastic feature 106 on a side of the electrical connector 50 such as a tooth profile 101 (FIG. 16A), Christmas tree profile (FIG. 16B), or a plurality of fingers or discs 103 (FIG. 16C), for example. This allows the electrical connector 50 to be inserted easily in one direction, and provides improved retention properties.

Figure 17A:
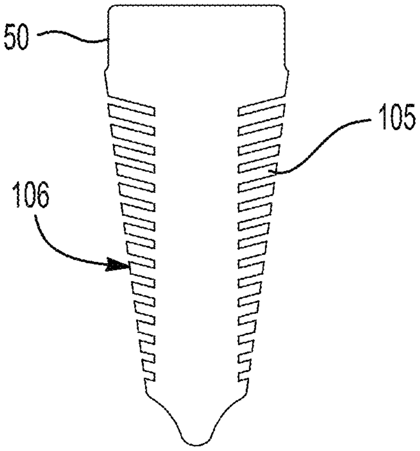
FIGS. 17A-B show additional examples of press-fit connections.
Figure 17B:
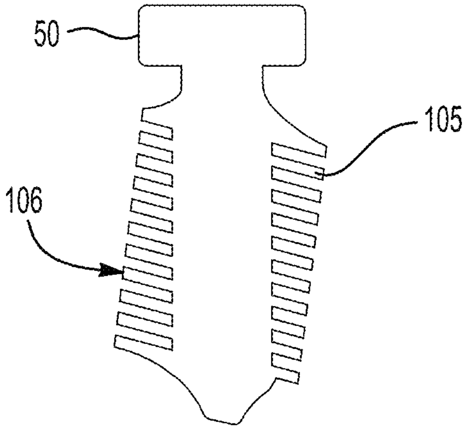
Figure 18A:
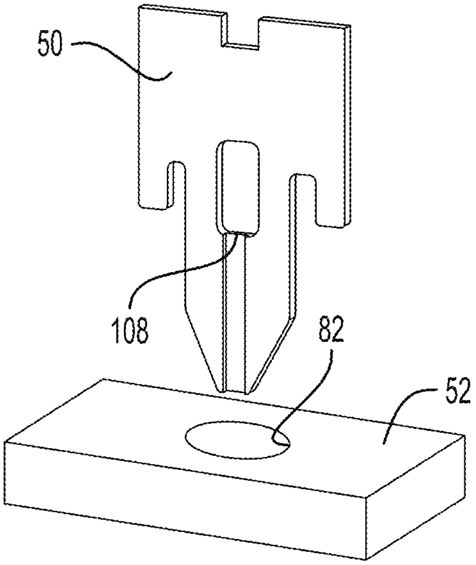
FIGS. 18A-D show another example of a press-fit connection.
Figure 18B:
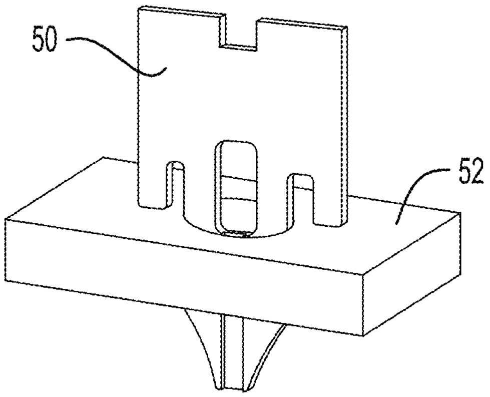
Figure 18C:
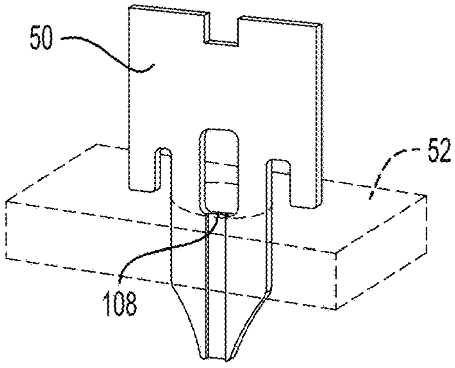
Figure 18D:
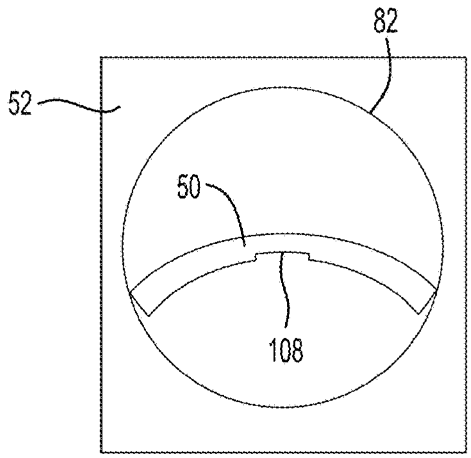
Figure 18E:
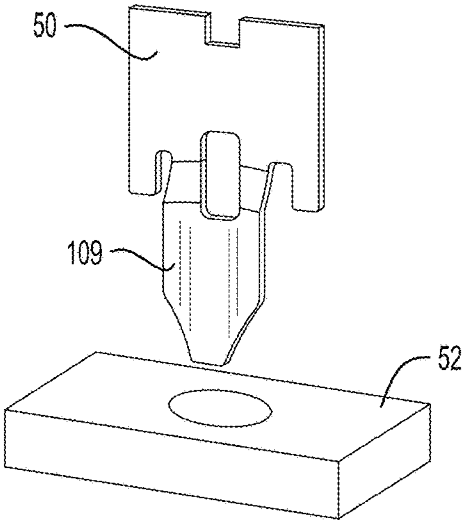
FIGS. 18E-H show another example of a press-fit connection.
Figure 18F:
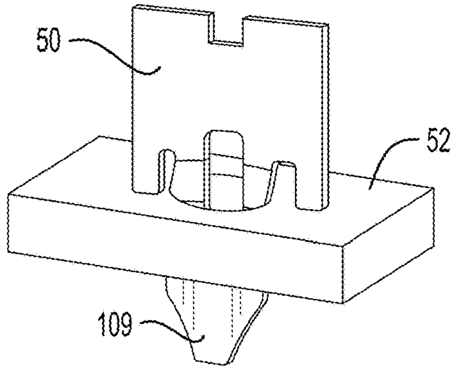
Figure 18G:
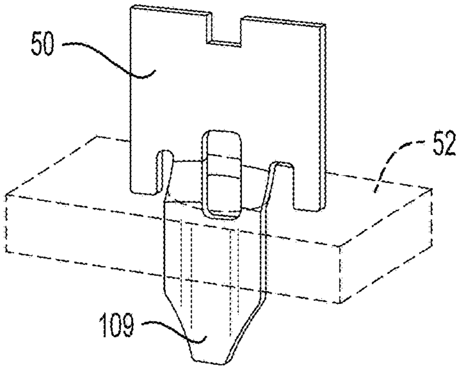
Figure 18H:
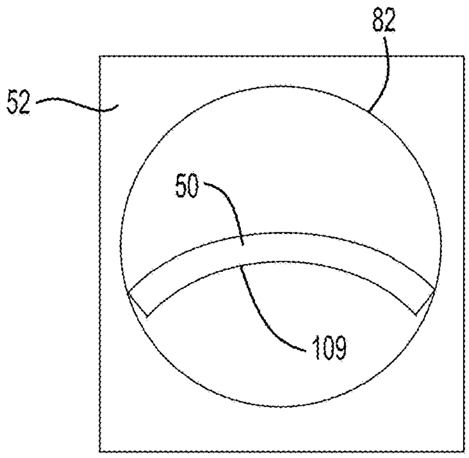

In examples shown in FIGS. 17A-B, there is a conical or double conical profile 105 for the elastic feature 106 on the electrical connector 50 to prevent motion in one or both directions once inserted.

In an example shown in FIGS. 18A-D, there is a locally eroded portion 108, such as a recess or depression for example, in a side of the electrical connector 50 to force bending during insertion. The locally eroded portion 108 is not a through hole, and is instead just a local thickness recession. Once inserted, the electrical connector 50 will form a V-shape within the hole 82.

In an example shown in FIGS. 18E-H, there is a laser folded shape 109, e.g. curved or contoured surface, formed on a side of the electrical connector 50, such as a V-shape or C-shape for example. This gives a degree of freedom for the electrical connector 50 to deform during the insertion. Thus, the V-shape or C-shape has an expanded initial state prior to insertion and a compression installation state after insertion.

Figure 19A:
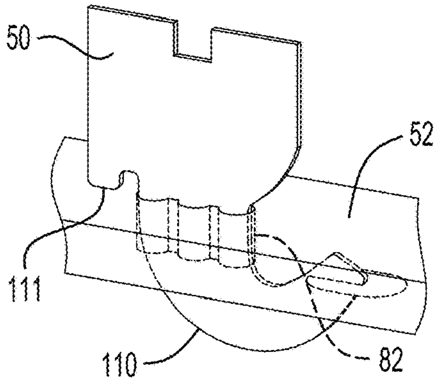
FIGS. 19A-B show another example of a press-fit connection.
Figure 19B:
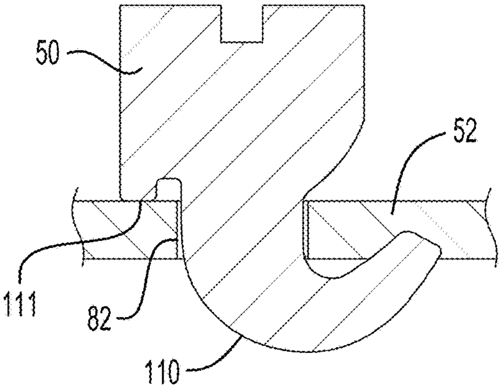
Figure 20A:
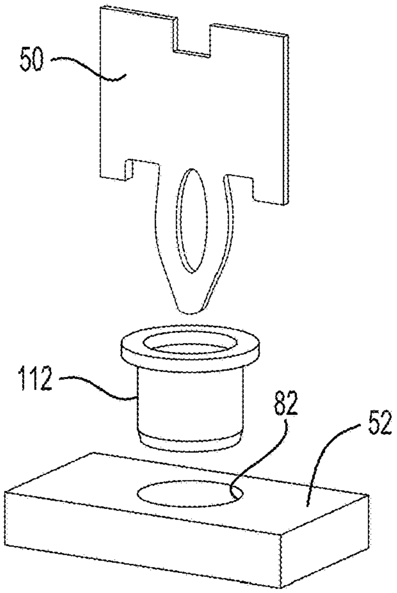
FIGS. 20A-D show another example of a press-fit connection.
Figure 20B:
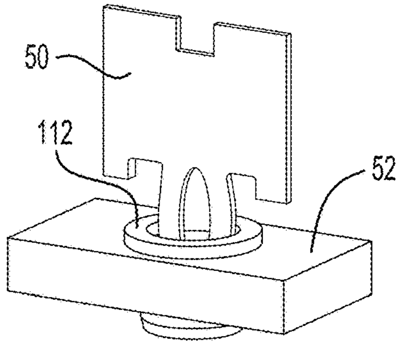
Figure 20C:
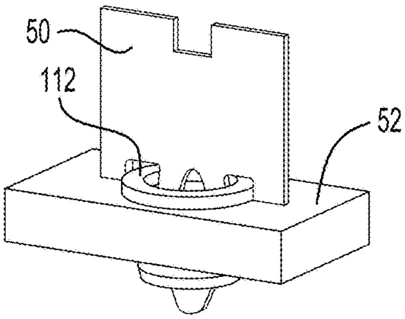
Figure 20D:
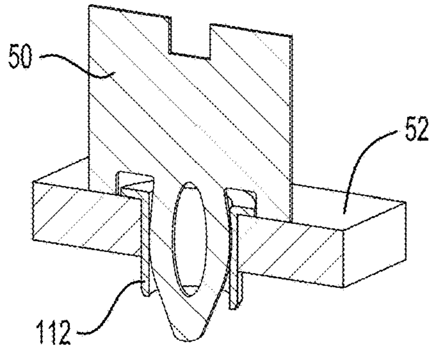

In an example shown in FIGS. 19A-B, there is an assembly of the electrical connector 50 with rotation. In this example, the distal end of the electrical connector 50 comprises a hook portion 110 that is tilted/angled to be inserted through the hole 82 or slit, and which is then rotated to hook underneath the circuit board 52 to grip an underside of the circuit board 52. When inserted, the connector body is rotated until a shoulder 111 abuts against the upper surface of the circuit board 52. The contact can be obtained naturally due to a clamping force provided by the super-elasticity of the SMA material, or reinforcement can be provided with the assembly of surrounding parts.

In one example shown in FIGS. 20A-D, there is a sleeve 112 provided around the electrical connector 50 or the hole 82. The sleeve 112 is a third component that will prevent damaging the circuit board 52 during insertion, and provide better electrical and mechanical properties as a transition medium between SMA material and the circuit board 52.

Figure 21:
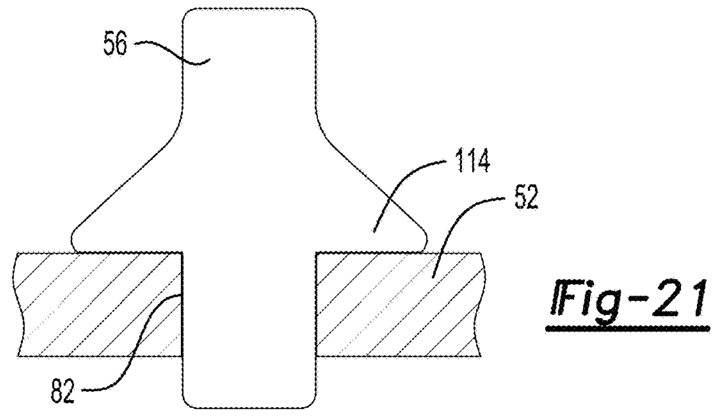
FIG. 21 shows another example of a press-fit connection.

In one example shown in FIG. 21, there is a mechanical support 114 provided such as a flange or wing for example, to prevent the rotation of the actuator in operation.

Figure 22:
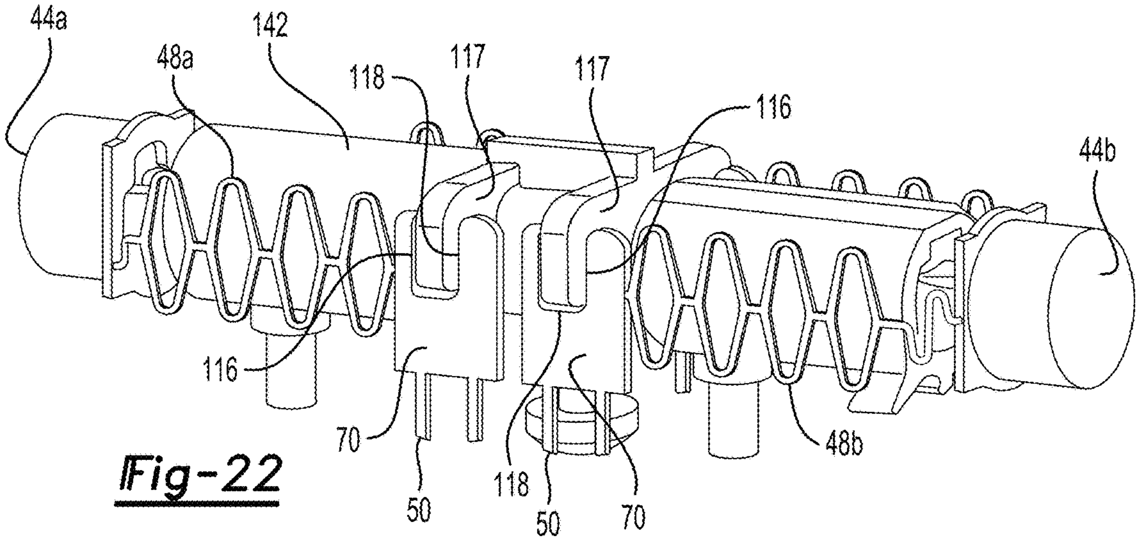
FIG. 22 is a perspective view of a mechanical support provided on connector pads of the SMA actuator.

In one example shown in FIG. 22, there is a mechanical support 116 provided on the connector pads 70, 72 at an edge opposite from the electrical connector 50. The mechanical support 116 comprises a cut-out portion 118 on the top of the press-fit interface that provide multiple advantages. The guide sleeve 142 includes arm extensions 117, extending outwardly from outer surface of the sleeve body, which are received within the cut-out portions 118. These cut-out portions 118 provide many advantages. For example, the cut-out portion 118 facilitates the assembly of the SMA body for pushing the electrical connectors 50 into the holes 82 of the circuit board 52. Additionally, the cut-out portion 118 can be used in the assembly to receive a reinforcing portion, e.g. the arm extensions 117, of the guide 42 to stabilize movement of the actuator.

Figure 23A:
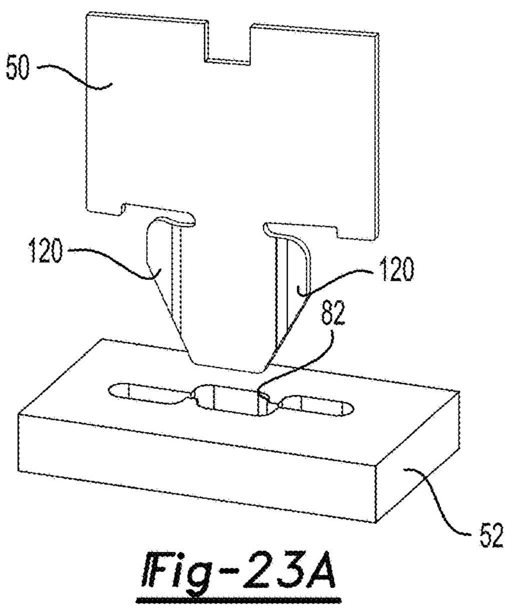
FIGS. 23A-D show another example of a press-fit connection.
Figure 23B:
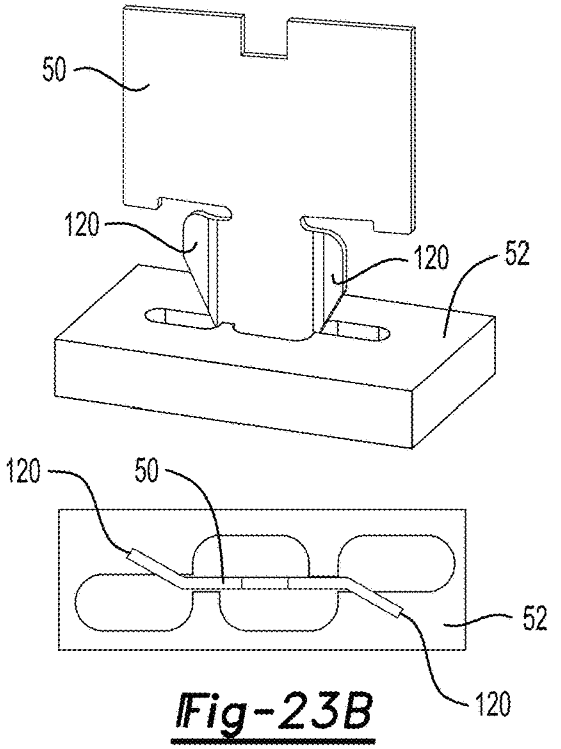
Figure 23C:
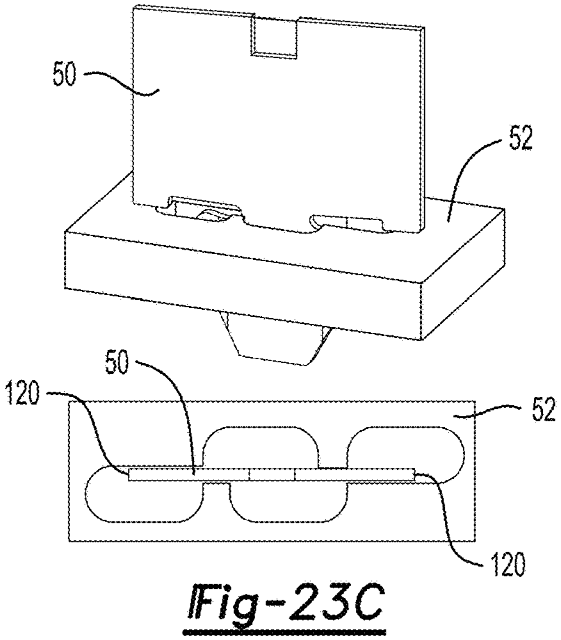
Figure 23D:
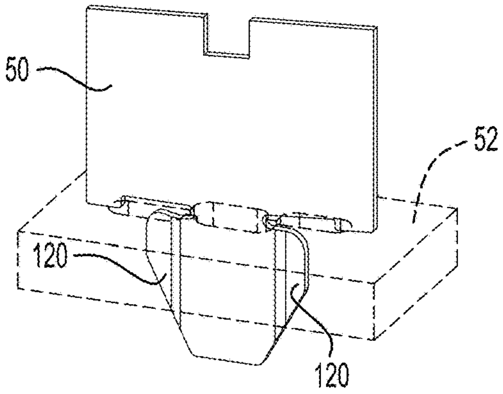
Figure 24A:
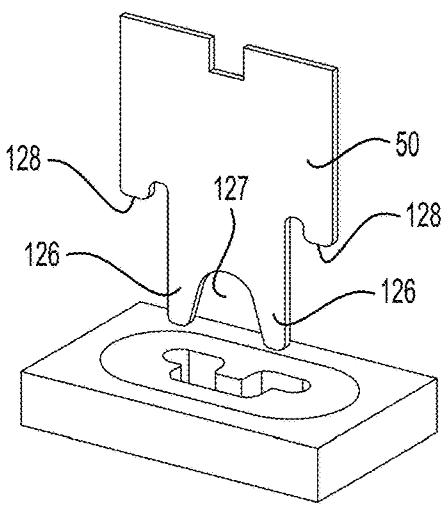
FIGS. 24A-E show another example of a press-fit connection.
Figure 24B:
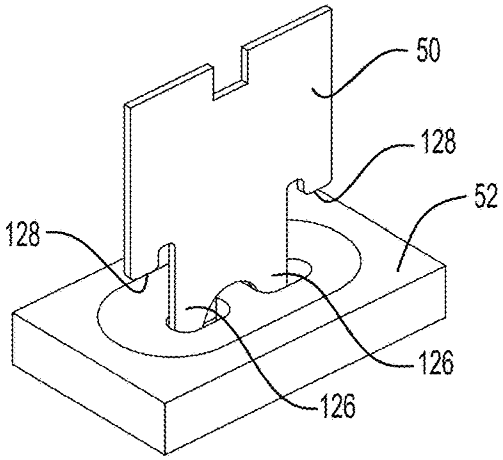
Figure 24D:
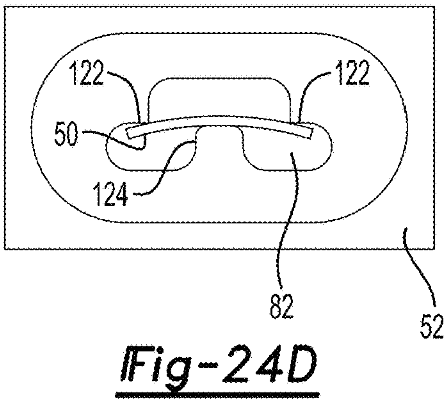
Figure 24C:
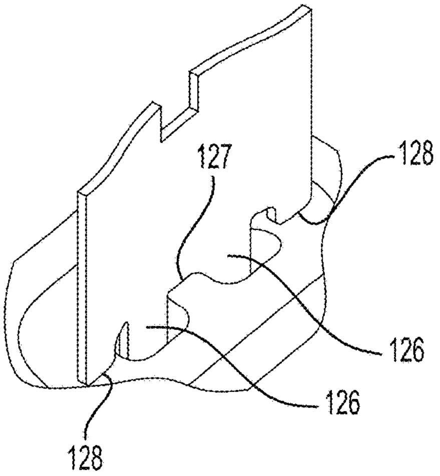
Figure 24E:
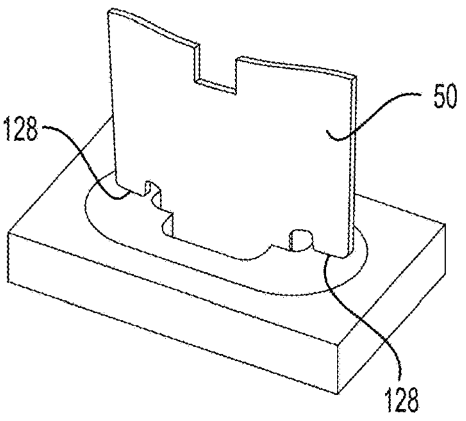
Figure 25A:
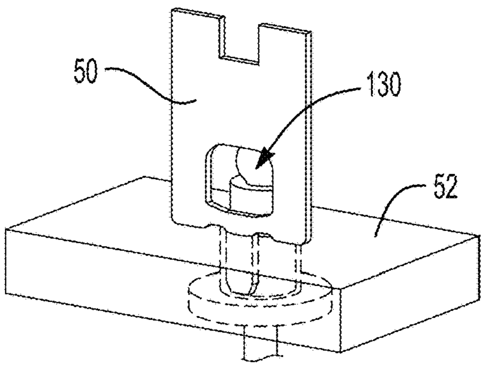
FIGS. 25A-D show another example of a press-fit connection.
Figure 25B:
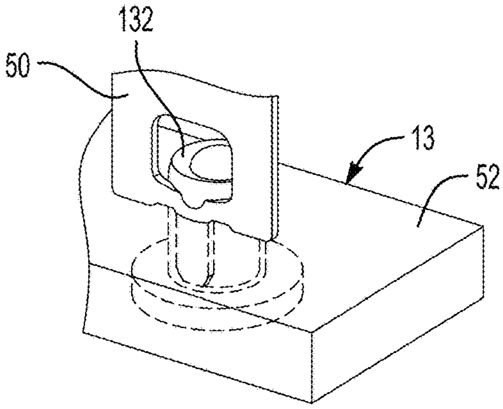
Figure 25C:
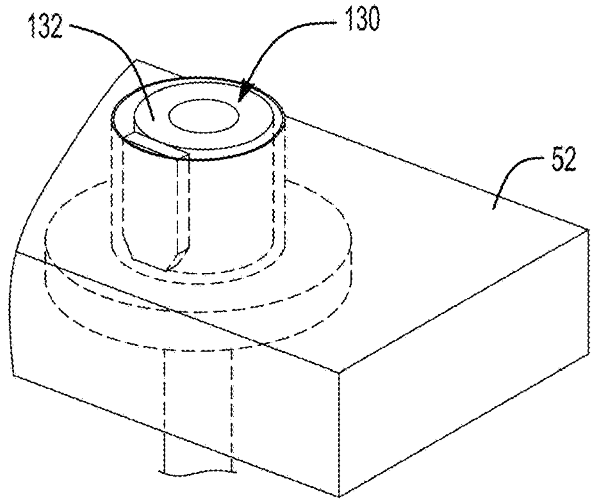
Figure 25D:
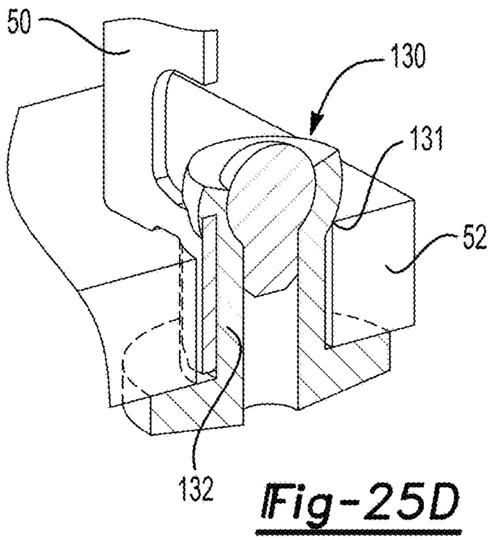

In one example shown in FIGS. 23A-B, laser folded self-locking features 120 are provided. In one example, the self-locking features 120 comprise folded winglets on a side of the pin body of the electrical connector 50 that deform during assembly and pop out on the underside of the circuit board at the end of the insertion.

In another example, a two-step process is used where the electrical contact 50 is at a certain temperature, e.g., a higher temperature than the application temperature, and will self-lock ramping down the temperature.

In one example shown in FIGS. 24A-E, a shoe horn connection interface is provided. In this example, the hole 82 is configured to have two abutment shoulders 122 and a center post 124. The electrical connector 50 has a pair of legs 126 extending downwardly and which are separated from each other by a C-shaped opening 127. Outward of each leg 126 is an upper abutment shoulder 128. In this configuration, the electrical connector 50 is inserted vertically downward, and then bent transversally to complete the insertion. During insertion, the legs 126 are inserted on either side of the post, and a portion of the electrical connector 50 above the C-shaped opening is bent to slide along the distal end of the center post 124. Each leg 126 also engages one of the abutment shoulders 122. The upper abutment shoulders 128 engage an upper surface of the circuit board 52 to define an insertion stop position.

In one example shown in FIGS. 25A-D, a pop-rivet configuration is shown. In this example, a pop-rivet 130 is provided at the circuit board 52 that is moveable within a sleeve 132 between an initial position and an installed position. The electrical connector 50 includes an opening 134 where a lower edge of the opening fits underneath a flange 131 of the sleeve 132. The pop-rivet 130 is pressed downwardly such that the flange 131 retains the electrical connector 50 to the circuit board.

The subject disclosure also provides that portions of the SMA actuator body have different material properties such that the SMA actuator body behaves differently for each portion. In one example, the SMA actuator 48 includes at least a first portion having a first material property and a second portion having a second material property different than the first material property. For example, the first portion could have a first activation temperature and the second portion could have a second activation temperature that is greater or lower than the first activation temperature. The first and second portions can include any selected portion of the SMA actuator body. Further, additional portions, e.g., third, fourth, etc. portions, can also be formed to have different material properties than the first and second portions.

For example, different portions of the accordion body can be selective to activate at different temperatures. The different portions would behave differently, e.g., expand/contract at different rates. Or, for example, the connector portions 70, 72, 51 could be formed to have different material properties than the accordion body. The connector portions of SMA actuator body can be treated such that the SMA actuator body only expands/contracts in specified areas, e.g. the accordion portion, and prevents the connector portions interfacing with circuit board from experiencing the SMA effect. For example, the press-fit electrical connectors 50 on the SMA actuator 48 can be treated to prevent experiencing the shape memory effect In one example, a heat treatment or chemical treatment is provided to the connection areas to prevent shape memory effect. A chemical treatment can also be used to prevent oxidation and maintain a good electrical contact.

In one example, the actuator body is comprised of SMA functionally graded material to provide a dynamic profile of the actuator opening, e.g. speed of opening depends the material treatment.

The SMA actuator 48 can also be configured to further facilitate guiding motion. For example, a functional cut-out shape/opening 136 (FIG. 26) can be formed in the SMA actuator body to allow for a click-to-assemble effect and/or to guide valve movement through the cut-out. In one example, the SMA actuator 48 includes a connection interface portion, e.g. the center pad portion 64, which comprises the cut-out shape 136 that can be an opening, hole, or any type of aperture that has a shape defined by a surrounding profile.

Figure 26:
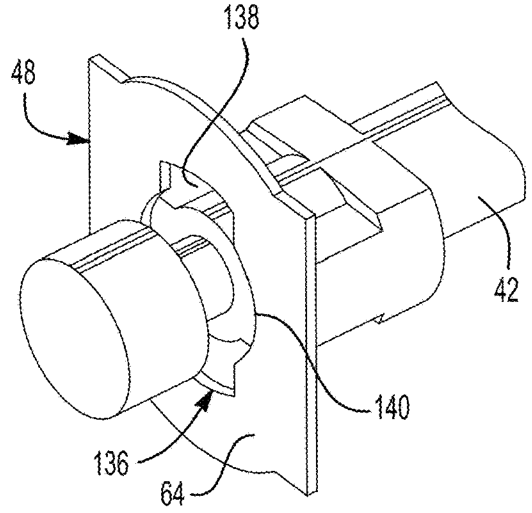
FIG. 26 is a perspective view of a center pad portion of the SMA actuator in association with a guide.

In one example shown in FIG. 26, the guide 42 is received within, and extends through, the cut-out shape/opening 136. As such, the cut-out opening 136 is provided in the center pad portion 64 for interaction with, or connection to, the guide 42. In one example, the cut-out opening 136 has a non-circular cut-out shape where the cut-out profile varies dimensionally about the linear axis of motion A. In one example, the cut-out opening 136 comprises an elongated slot 138 with an enlarged center portion 140. The enlarged center portion 140 comprises arcuate surfaces that mate with corresponding arcuate surfaces on the guide 42. Slot portions above and below the enlarged center portion 140 are narrower than a diameter of the enlarged center portion 140. This allows the guide 42 to be rotated to a first position where the guide 42 can be inserted through the opening such that the opening is filled, and then subsequently rotate by ninety degrees to provide open areas above and below the guide. In this position, the guide 42 can be guided in a stable manner via the mating arcuate surfaces.

In one example, the cut-out portion has connection feature to provide mechanical support for the resilient member 46, and can act as a buffer for any material change between the tip interface 44 and the guide/spring support 42.

Figure 27:
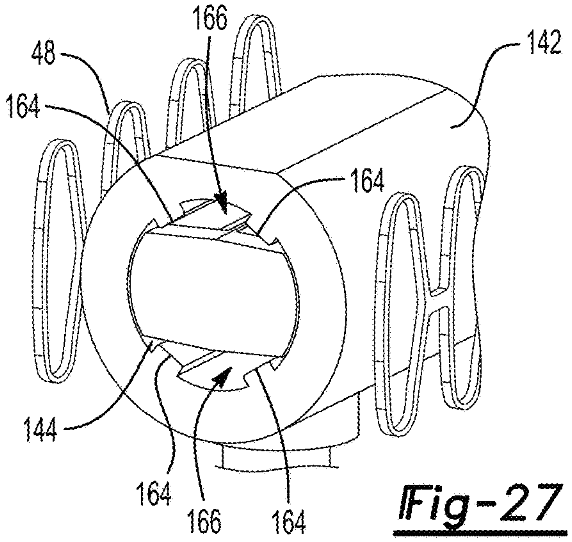
FIG. 27 is a perspective end view of guide sleeve and guide that support the SMA actuator.
Figure 28:
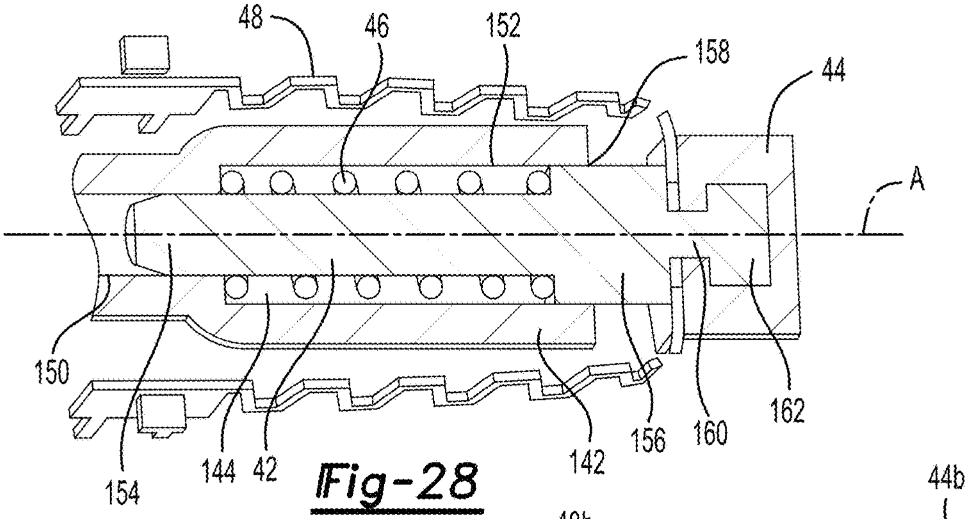
FIG. 28 is a section view of a guide sleeve, guide, and tip interface.

FIGS. 27-28 show an example of the guide sleeve 142 in greater detail. As discussed above, the guide sleeve 142 has an internal cavity 144 that defines the single axis of motion A along a guide path. In one example, the guide sleeve 142 comprises a cylindrical member having an internal cavity that extends from a first end to a second end. The guide 42 is at least partially received within the guide sleeve 142 and is movable along the guide path. The guide sleeve 142 supports the SMA actuator 48 for movement along the single axis of motion A.

The resilient member 46 is supported within an open area formed between the guide 42 and the guide sleeve 142 as shown in FIG. 28. Thus, the resilient member 46 is fully covered and protected. In one example, the internal cavity 144 has a least a first portion 150 defined by a first dimension and a second portion 152 defined by a second dimension that is greater than the first dimension. One portion 154 of the guide 42 is defined by an outer dimension that closely matches the first dimension of the internal cavity 144. The portion 154 of the guide that is located in the second portion 152 provides for the open area that receives the resilient member 46. The guide 142 includes an enlarged portion 156 having an outer dimension that closes matches the second dimension of the second portion 152. This enlarged portion 156 extends outwardly of a sleeve opening 158 at one end of the sleeve. The guide 142 further includes a narrowing neck portion 160 that transitions between the enlarged portion 156 and a distal end portion 162 of the guide that is defined by an outer dimension that is less than the enlarged portion 156 and greater than an outer dimension of the neck portion 160. The distal end portion is captured within an internal cavity of the tip interface 44 as shown in FIG. 28.

In one example, the sleeve opening 158 in the guide sleeve 142 is defined by a variable profile that includes inwardly extending ribs/splines 164 (FIG. 27) to prevent the guide 42 from rotating within the sleeve 142 and to provide consistent liner motion. Additionally, the variable profile prevents the guide 42 from rotating to maintain an open air path as indicated at 166. As shown in FIG. 22, the sleeve 142 also includes mating portions, e.g. arm extensions 117, on opposing sides of the outer sleeve body that are associated with distal end pads 70, 72 of the first 66 and second 68 accordion legs of the SMA actuator 48. The arm extensions 117 are fit into the cut-out portion 118 on the top of the end pads 70, 72. This provides additional support for first 66 and second 68 accordion legs at mechanical connection area to circuit board 52. Further, this prevents any imbalance between the first 66 and second 68 accordion legs during linear movement of the actuator.

Figure 29:
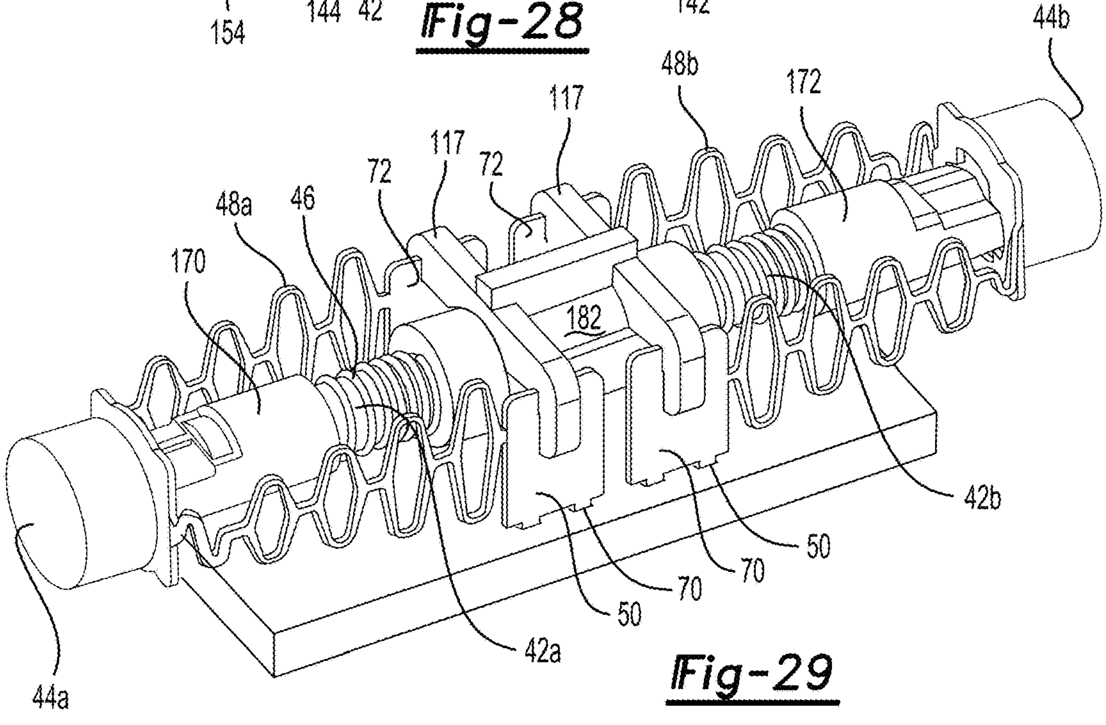
FIG. 29 is a perspective view of another example variant of a SMA actuator assembly.

FIG. 29 shows a configuration where the resilient member 46 is not fully covered, and the actual guiding happens with two parts sliding into one another. In this example, the first guide **42*a* is positioned within a first sleeve portion 172 and the second guide 42*b* is positioned within a second sleeve portion 180. A center sleeve portion 182 receives opposing ends of the first 42*a* and second 42*b* guides. The first tip interface 44*a* is associated with the first SMA actuator 48*a* and the second tip interface 44*b* is associated with the second SMA actuator 48*b*. The center sleeve portion 182 includes arm extensions 117 that are coupled to the pads 70, 72 to stabilize movement of the actuators 48*a*, 48*b*. The resilient member 46 extends through the sleeve portions 172, 180, 182. The SMA actuator 48 and circuit board 52** are connected as described above.

Figure 30A:
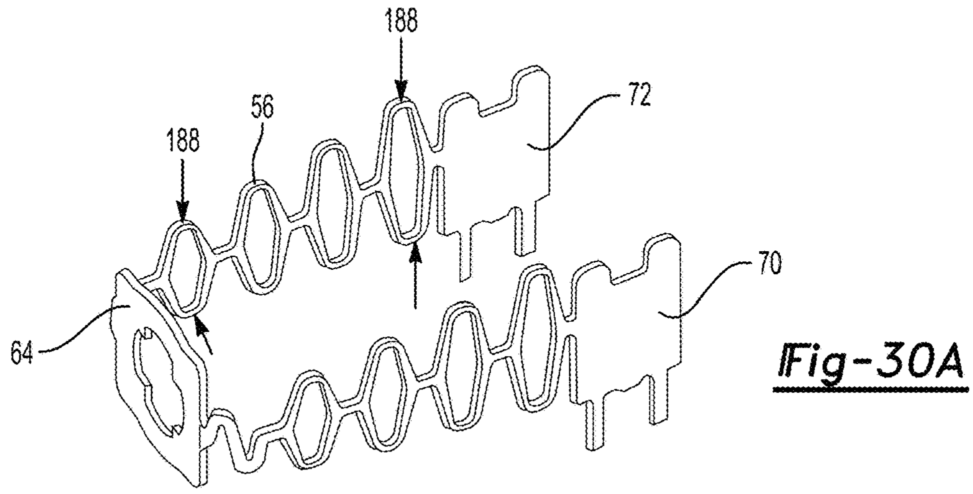
FIGS. 30A-C show examples of SMA actuators having different body configurations.
Figure 30B:
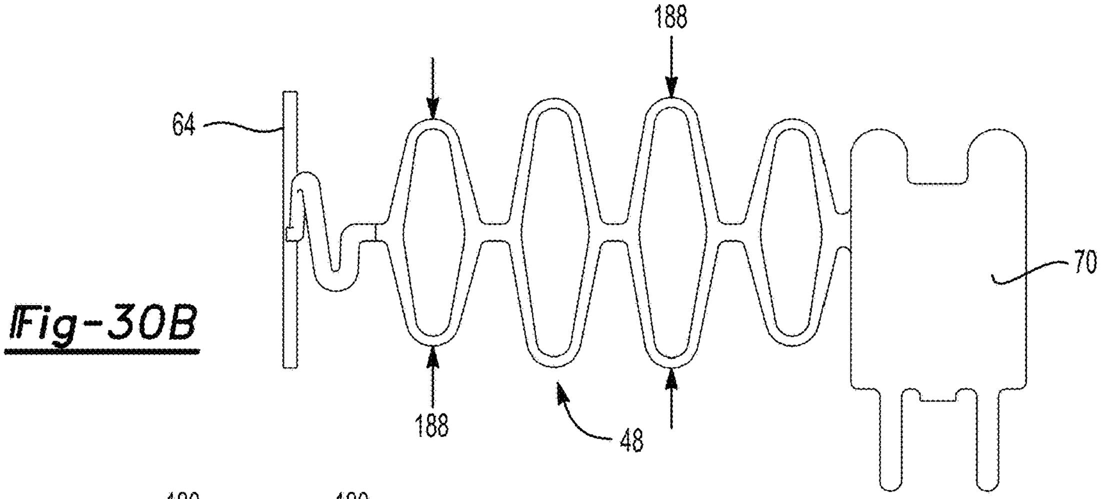
Figure 30C:
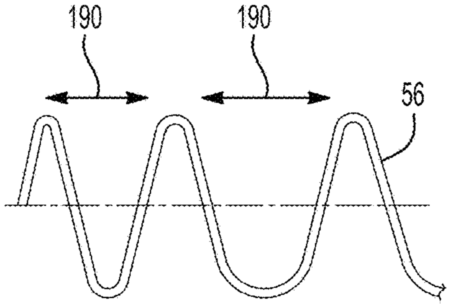

In one example, a functional shape of the SMA actuator 48 is varied, e.g., has a non-uniform or asymmetrical shape, to provide different capabilities. In one example, the SMA actuator 48 has a variable shape in a direction along the single axis of motion A as shown in FIGS. 30A-C. For example, the accordion shaped body 56 can have a gradually increasing/decreasing amplitude 188 (FIGS. 30A-B), or the accordion shaped body 56 can have a gradually decreasing/increasing pitch (FIG. 30C).

Figure 31:
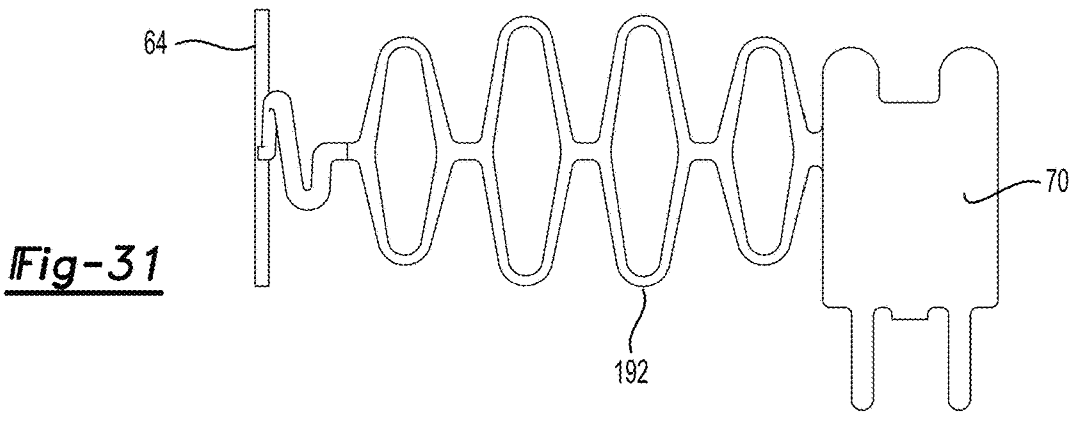
FIG. 31 shows another example of a SMA actuator body configuration.

Also, as shown in FIG. 31, the shape of the SMA actuator 48 can be wider/taller than at the pads 64, 70, 72. For example, a vertically outermost dimension 192 of the body extend vertically above, or extend outward of, a vertically outermost edge of the pads 70, 72. This provides the flexibility to have longer deforming segments.

Figure 32:
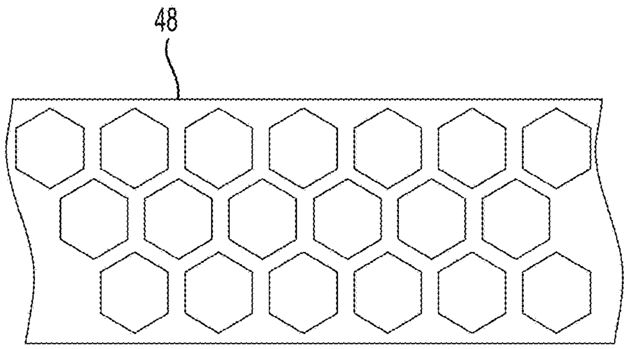
FIG. 32 shows another example of a SMA actuator body configuration.
Figure 33:
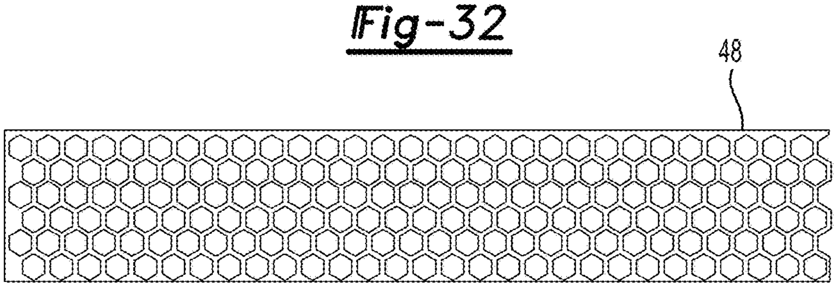
FIG. 33 shows another example of a SMA actuator body configuration.

Also, the shape of the SMA actuator 48 can take different forms such as a mesh, diamond (FIG. 32), or honeycomb shape (FIG. 33), for example. The shape can be tailored to control/stabilize movement along the path of motion and/or to control actuation rate.

Figure 34A:
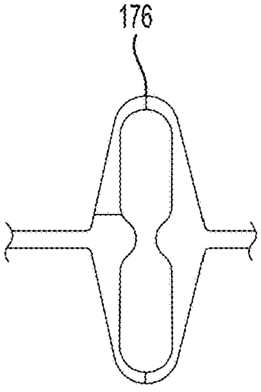
FIGS. 34A-C show different examples of segments of a SMA actuator body.
Figure 34B:
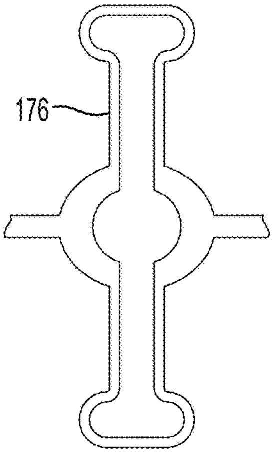
Figure 34C:
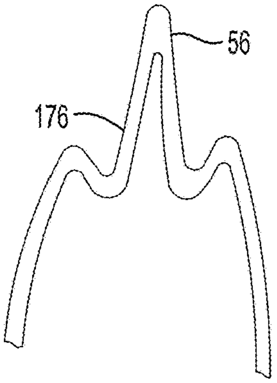

Also, the shape of the SMA actuator 48 can take different forms such as having a segment design with weak cross-section area 176 taking the deformation as shown in FIGS. 34A-C. The segment design can comprise a ring or loop shaped configuration with thicker and narrower portions. The narrower portions comprise the weak cross-section area 176.

In another example, the SMA actuator 48 can be laser-cut first and then folded. In this way it is no longer a 2D sheet, and the functional shape of the actuator is 3-dimensioned and curved. This provides better packaging.

Figure 35A:
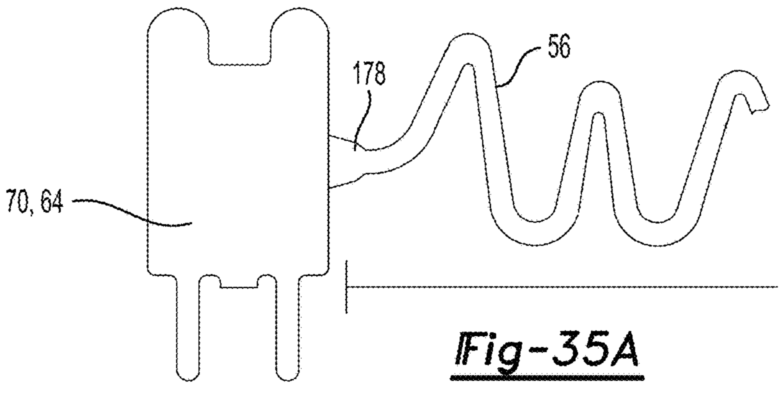
FIG. 35A shows a transition between a pad portion of a SMA actuator body and a leg portion.
Figure 35B:
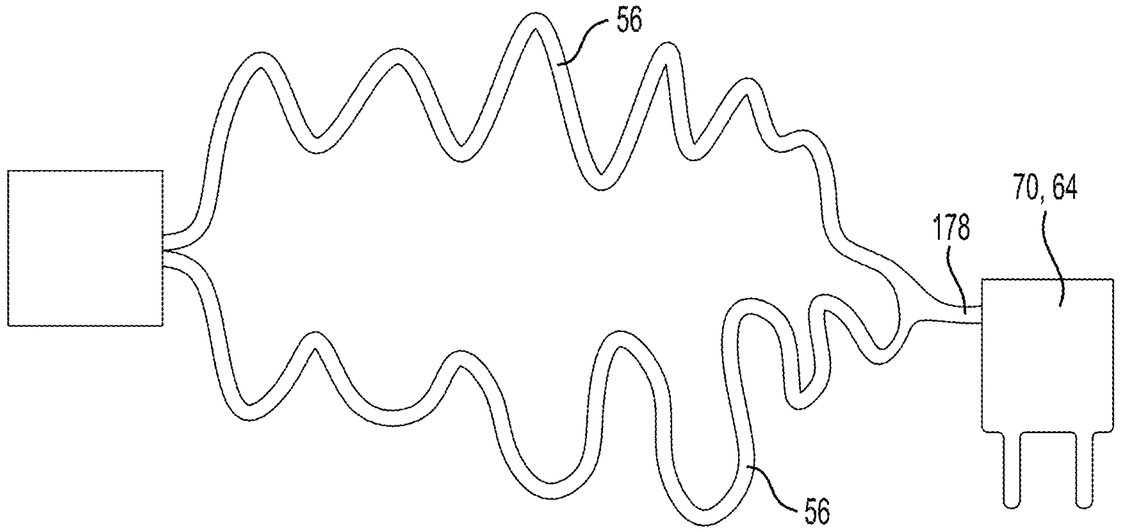
FIG. 35B shows another example with two leg portions.
Figure 35C:
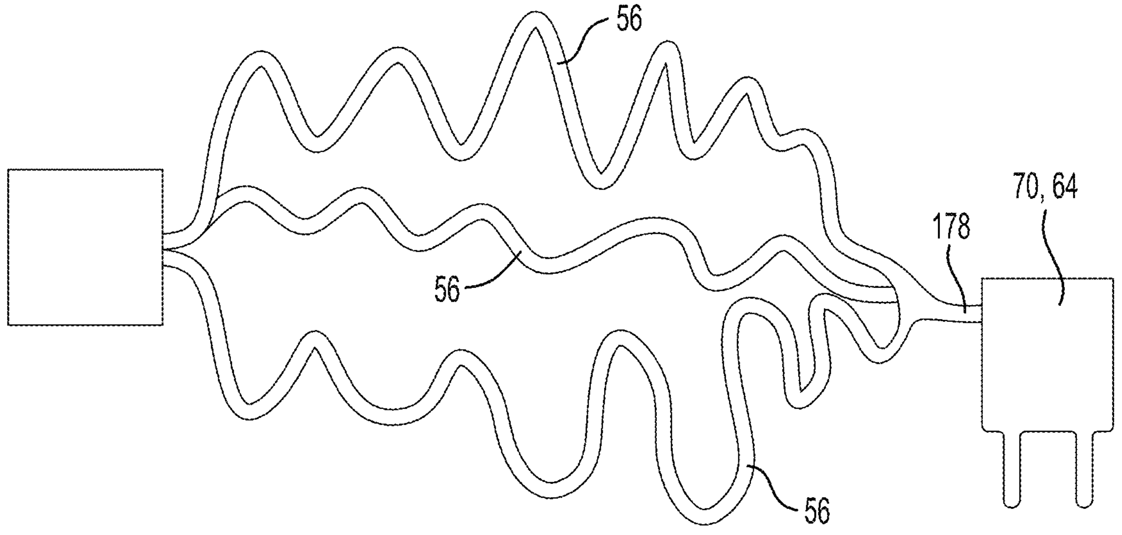
FIG. 35C shows another example with three leg portions.

In another example, there is a gradual transition between the functional shape of the accordion shaped body 56 and the end features. For example, as shown in FIG. 35A, a transition area 178 from the end pads 70, 72 to the accordion shaped body 56 can be decreased gradually from a the pad height to a thickness of the accordion portion. This configuration avoids the potential for failure at the weak point of the design. Further, while the functional shape can be a single meandering portion (FIG. 35A), any number of meandering portions can be provided between the connector and the pad platform where the movement is collected. FIGS. 35B-C show additional examples with multiple meandering portions.

Also, the disclosed configurations using the SMA actuator 48 are resilient to climate variations such as temperature and humidity, for example. This makes it a robust design.

I. In one example, a method and apparatus of the subject disclosure provides a compact configuration with a principal actuator direction being aligned with a circuit board. In one example, an apparatus comprises:

at least one guide movable along a single axis of motion;

at least one tip interface associated with the at least one guide, the at least one tip interface moveable between a first position and a second position;

a resilient member biasing the at least one tip interface to one of the first position and the second position;

a shape-memory alloy actuator that moves the at least one tip interface to the other of the first position and second position in response to an electrical input, the shape-memory alloy actuator including at least one electrical connector; and at least one circuit board connected to the at least one electrical connector, wherein the single axis of motion extends non-perpendicular to a planar surface of the at least one circuit board.

The apparatus may include any of the following features either alone or in any combination thereof.

For example, the apparatus may include, wherein:

the at least one guide comprises a single guide;

the at least one tip interface comprises a single tip interface coupled to one end of the single guide at a connection interface; and a body portion of the shape-memory alloy actuator includes a center pad portion coupled to the single guide and the single tip interface at the connection interface.

For example, the apparatus may include, wherein:

the resilient member surrounds at least a portion of the single guide and includes a first end moveable with the single guide and a second end seated on a fixed spring support.

For example, the apparatus may include, wherein:

the at least one guide comprises a single guide;

the at least one tip interface comprises a first tip interface that is coupled to one end of the single guide at a first connection interface and a second tip interface that is coupled to an opposite end of the single guide at a second connection interface; and a body portion of the shape-memory alloy actuator includes a center pad portion that is coupled to the single guide and to one of the first tip interface or second tip interface at a respective one of the first connection interface or second connection interface.

For example, the apparatus may include, wherein:

the resilient member completely surrounds at least a portion of the single guide from one end of the single guide to an opposite end of the single guide, and wherein the resilient member includes a first end moveable with the single guide and a second end seated on a fixed spring support.

For example, the apparatus may include, wherein:

the at least one guide comprises a first guide and a second guide;

the at least one tip interface comprises a first tip interface that is coupled to one end of the first guide at a first connection interface and a second tip interface that is coupled to one end of the second guide at a second connection interface; and the shape-memory alloy actuator comprises a first actuator comprising a first center pad portion that is coupled to the first guide and the first tip interface at the first connection interface, and comprises a second actuator comprising a second center pad portion that is coupled to the second guide and the second tip interface at the second connection interface.

For example, the apparatus may include, wherein:

a first end of the resilient member surrounds at least a portion of the first guide and a second end of the resilient member surrounds at least a portion of the second guide; and the first end is moveable with the first guide and the second end is moveable with the second guide.

For example, the apparatus may include, wherein the at least one electrical connector extends toward the at least one circuit board in a direction that is non-parallel to the single axis of motion For example, the apparatus may include, wherein the shape-memory alloy actuator comprises:

a center pad portion;

first and second accordion legs on opposing sides of the center pad portion, wherein each of the first and second accordion legs extend to a distal end comprising a connector pad; and wherein the center pad portion is associated with the at least one guide and each connector pad includes at least one electrical connector to connect to the at least one circuit board.

For example, the apparatus may include, wherein the at least one tip interface interacts with one or more fluid bladders for a seat.

For example, the apparatus may include, wherein the shape-memory alloy actuator comprises a body portion extending between two connection portions that each include at least one electrical connector, and wherein the body portion and connection portions are formed as a single piece of material comprising cut edges.

For example, the apparatus may include a guide sleeve that receives the at least one guide, and wherein the resilient member is positioned within a cavity formed between an inner surface of the guide sleeve and an outer surface of the at least one guide.

For example, the apparatus may include, wherein the guide sleeve includes one or more protrusions that prevent rotation of the at least one guide within the guide sleeve.

In one example, a method comprises:

providing at least one tip interface associated with at least one guide, the at least one tip interface moveable between a first position and second position along a single axis of motion;

biasing the at least one tip interface to one of the first position and the second position;

moving the at least one tip interface to the other of the first position and second position via a shape-memory alloy actuator that is responsive to an electrical input; and connecting at least one circuit board to at least one electrical connector of the shape-memory alloy actuator such that the single axis of motion extends non-perpendicular to a planar surface of the at least one circuit board.

The method may include any of the following steps either alone or in any combination thereof.

For example, the method may include laser cutting the shape-memory alloy actuator from a single sheet of material such that the shape-memory alloy actuator comprises a single body extending between two connection portions that each include at least one electrical connector.

For example, the method may include selecting one or more guides, one or more tip interfaces, one or more shape-memory alloy actuators, and the at least one circuit board in different configurations to provide a plurality of actuator variants; and providing a resilient member as a single spring that is used for each variant.

For example, the method may include associating the at least one tip interface with one or more fluid bladders in a seat.

For example, the method may include, wherein the at least one guide comprises a single guide, the at least one tip interface comprises a single tip interface that is coupled to one end of the single guide at a connection interface, and a body portion of the shape-memory alloy actuator includes a center pad portion, the method including:

coupling the center pad portion to the single guide and the single tip interface at the connection interface;

surrounding at least a portion of the single guide with a resilient member; and mounting a first spring end to the single guide and seating a second spring end on a fixed spring support.

For example, the method may include, wherein the at least one guide comprises a single guide, the at least one tip interface comprises a first tip interface that is coupled to one end of the single guide at a first connection interface and a second tip interface that is coupled to an opposite end of the single guide at a second connection interface, and a body portion of the shape-memory alloy actuator includes a center pad portion, the method including:

coupling the center pad portion to the single guide and to one of the first tip interface or second tip interface at a respective one of the first connection interface or second connection interface;

surrounding at least a portion of the single guide with a resilient member; and mounting a first spring end to the single guide and seating a second spring end on a fixed spring support.

For example, the method may include, wherein the at least one guide comprises a first guide and a second guide, the at least one tip interface comprises a first tip interface that is coupled to one end of the first guide at a first connection interface and a second tip interface that is coupled to one end of the second guide at a second connection interface, and the shape-memory alloy actuator comprises a first actuator comprising a first center pad portion and a second actuator comprising a second center pad portion, the method including:

coupling the first guide and the first tip interface to the first center pad portion at the first connection interface;

coupling the second guide and the second tip interface to the second center pad portion at the second connection interface;

surrounding at least a portion of the first guide with a first end of a resilient member; and surrounding at least a portion of the second guide with a second end of the resilient member, wherein the first end is moveable with the first guide and the second end is moveable with the second guide.

II. In one example, the subject disclosure provides a method and apparatus comprising an attachment interface for a shape-memory alloy actuator to a circuit board. In one example, an apparatus comprises:

at least one guide;

at least one tip interface associated with the at least one guide, the at least one tip interface moveable between an extended position and a retracted position;

a shape-memory alloy actuator that moves the at least one tip interface to the retracted position in response to an electrical input, the shape-memory alloy actuator including at least one electrical connector; and at least one circuit board connected to the at least one electrical connector at a connection interface, wherein the connection interface comprises a mechanical locking interface.

The apparatus may include any of the following features either alone or in any combination thereof.

For example, the apparatus may include, wherein the at least one electrical connector comprises a plurality of electrical connectors.

For example, the apparatus may include, wherein the shape-memory alloy actuator comprises:

a center pad portion;

first and second legs on opposing sides of the center pad portion, wherein each of the first and second legs extend to a distal end comprising a connector pad; and wherein the center pad portion is associated with the at least one guide and each connector pad includes at least one electrical connector from the plurality of connectors that is mechanically locked to the at least one circuit board.

For example, the apparatus may include, wherein the first and second legs are moveable along an axis of motion, and wherein each electrical connector extends in a direction that is non-parallel to the axis of motion.

For example, the apparatus may include, wherein the shape-memory alloy actuator moves the at least one tip interface along a single axis of motion that extends non-perpendicular to a planar surface of the circuit board.

For example, the apparatus may include, wherein the at least one electrical connector extends from the shape-memory alloy actuator in a direction that is non-parallel (e.g., transverse or perpendicular) to the single axis of motion.

For example, the apparatus may include, wherein the mechanical locking interface comprises a press-fit interface.

For example, the apparatus may include, wherein the at least one circuit board includes at least one receptacle at the connection interface, and wherein the at least one electrical connector comprises a greater cross-section than a cross-section of the at least one receptacle, and wherein the at least one electrical connector is deformable to fit within the at least one receptacle to provide a press-fit.

For example, the apparatus may include, wherein the at least one electrical connector comprises an elongated body comprising one or more cut-outs.

For example, the apparatus may include, wherein the at least one electrical connector comprises an elongated body comprising a plurality of deformable protrusions extending along a length of the elongated body.

For example, the apparatus may include, wherein the shape-memory alloy actuator is positioned on one side of the at least one circuit board, and wherein the at least one electrical connector includes one or more grips that engage an opposing side of the at least one circuit board.

For example, the apparatus may include, wherein the at least one electrical connector comprises an elongated body comprising one or more recesses or depressions formed along an outer surface of the elongated body.

For example, the apparatus may include, wherein the at least one tip interface is associated with one or more fluid bladders in a seat.

In one example, a method comprises:

at least one guide;

providing at least one tip interface associated with at least one guide, the at least one tip interface moveable between an extended position and a retracted position;

moving the at least one tip interface to the retracted position via a shape-memory alloy actuator that is responsive to an electrical input, the shape-memory alloy actuator including at least one electrical connector; and mechanically locking the at least one electrical connector to at least one circuit board at a connection interface.

The method may include any of the following steps either alone or in any combination thereof.

For example, the method may include assembling the at least one electrical connector to the at least one circuit board in one linear motion.

For example, the method may include, wherein the shape-memory alloy actuator is moveable along an axis of motion, and including extending each electrical connector from a body of the shape-memory alloy actuator in a direction that is non-parallel to the axis of motion.

For example, the method may include using the shape-memory alloy actuator to move the at least one tip interface along a single axis of motion that extends non-perpendicular to a planar surface of the at least one circuit board, and wherein the at least one electrical connector extends from the shape-memory alloy actuator in a direction that is non-parallel to the single axis of motion.

For example, the method may include, wherein mechanically locking comprises press-fitting the at least one electrical connector into a corresponding receptacle in at least one circuit board.

For example, the method may include one or more of:

deforming the at least one electrical connector to fit within the at least one receptacle to provide a press-fit;

forming the at least one electrical connector as an elongated body comprising one or more cut-outs;

forming the at least one electrical connector as an elongated body comprising a plurality of deformable protrusions extending along a length of the elongated body;

forming the at least one electrical connector to have one or more grips that engage an opposing side of the at least one circuit board;

forming the at least one electrical connector as an elongated body to have one or more recesses or depressions along an outer surface of the elongated body.

For example, the method may include associating the at least one tip interface with one or more fluid bladders in a seat.

III. In one example, the subject disclosure provides a method and apparatus where portions of a shape-memory alloy actuator body have different material properties such that the shape-memory alloy actuator body behaves differently for each portion. In one example, an apparatus comprises:

at least one tip interface moveable between an extended position and a retracted position; and a shape-memory alloy actuator that moves the at least one tip interface to the retracted position in response to an electrical input, the shape-memory alloy actuator including at least a first portion comprising a first material property and a second portion comprising a second material property different than the first material property.

The apparatus may include any of the following features either alone or in any combination thereof.

For example, the apparatus may include, wherein the first material property comprises a first activation temperature and the second material property comprises a second activation temperature that is greater than or less than the first activation temperature.

For example, the apparatus may include, wherein the first material property comprises a first rate of contraction and the second material property comprises a second rate of contraction that is greater than or less than the first rate of contraction.

For example, the apparatus may include, wherein the first portion comprises a different shape than the second portion.

For example, the apparatus may include, wherein the shape-memory alloy actuator comprises an extendable body with at least one electrical connector interface, and wherein the first portion comprises the extendable body and the second portion comprises the at least one electrical connector interface.

For example, the apparatus may include, wherein the first material property comprises a material comprising a shape-memory alloy, and wherein the second material property comprises a material different than a shape-memory alloy.

For example, the apparatus may include, wherein the shape-memory alloy actuator comprises:

a center pad portion;

first and second legs on opposing sides of the center pad portion, wherein each of the first and second legs extend to a distal end comprising a connector pad; and wherein the center pad portion is associated with the at least one guide, and wherein each connector pad includes at least one electrical connector.

For example, the apparatus may include, wherein the first portion comprises the first and second legs and the second portion comprises the at least one electrical connector.

For example, the apparatus may include, wherein the at least one electrical connector is mechanically locked to at least one circuit board.

For example, the apparatus may include, wherein the first and second legs comprise an accordion shape.

For example, the apparatus may include, wherein the at least one tip interface is associated with one or more fluid bladders in a seat.

In one example, a method comprises:

forming a shape-memory alloy actuator that is responsive to an electrical input to have at least a first portion comprising a first material property and a second portion comprising a second material property different than the first material property.

The method may include any of the following steps either alone or in any combination thereof.

For example, the method may include, wherein the first material property comprises a first activation temperature and the second material property comprises a second activation temperature that is greater than or less than the first activation temperature.

For example, the method may include forming the first portion to have a different shape than the second portion.

For example, the method may include, wherein the shape-memory alloy actuator comprises an extendable body with at least one electrical connector interface, and including forming the first portion as the extendable body and the second portion as the at least one electrical connector interface.

For example, the method may include, wherein the first material property comprises a material comprising a shape-memory alloy, and wherein the second material property comprises a material different than a shape-memory alloy.

For example, the method may include, wherein the shape-memory alloy actuator comprises a center pad portion, first and second legs on opposing sides of the center pad portion, wherein each of the first and second legs extend to a distal end comprising a connector pad, and wherein the center pad portion is associated with the at least one guide, and wherein each connector pad includes at least one electrical connector, the method including:

forming the first portion as the first and second legs; and forming the second portion as the at least one electrical connector.

For example, the method may include mechanically locking the at least one electrical connector to at least one circuit board.

For example, the method may include forming the first and second legs to have an accordion shape.

For example, the method may include associated the at least one tip interface with one or more fluid bladders in a seat.

IV. In one example, the subject disclosure provides a method and apparatus where there is a functional cut-out shape in a shape-memory alloy actuator body to allow for click-to-assemble effect and/or to guide valve movement through the cut-out. In one example, an apparatus comprises:

at least one guide;

at least one tip interface associated with the at least one guide, the at least one tip interface moveable between an extended position and a retracted position; and a shape-memory alloy actuator that moves the at least one tip interface to the retracted position in response to an electrical input, the shape-memory alloy actuator including a connection interface portion that comprises a cut-out that receives the at least one guide.

The apparatus may include any of the following features either alone or in any combination thereof.

For example, the apparatus may include, wherein the cut-out is non-circular in shape.

For example, the apparatus may include, wherein the cut-out is defined by a variable profile.

For example, the apparatus may include, wherein the cut-out comprises a plurality of discrete cut-outs.

For example, the apparatus may include, wherein at least one discrete cut-out cooperates with the at least one guide, and wherein at least one discrete cut-out cooperates with the at least one tip interface.

For example, the apparatus may include, wherein the shape-memory alloy actuator comprises:

a center pad portion;

first and second legs on opposing sides of the center pad portion, wherein each of the first and second legs extend to a distal end comprising a connector pad; and wherein the center pad portion includes the cut-out.

For example, the apparatus may include, wherein the cut-out comprises one or more first cut-outs that receive corresponding protrusions on the at least one guide, and further comprises one or more second cut-outs that receive corresponding protrusions on the at least tip interface.

For example, the apparatus may include, wherein the center pad portion is sandwiched between the at least tip interface and the at least one guide (connection feature to provide mechanical support for the spring, and to act as a buffer for any material change between the tip of the tip interface and the guide/spring support).

For example, the apparatus may include, wherein the cut-out is defined by a variable profile, and wherein the at least one guide is moveable along a single axis of motion and includes a distal end that extends through the cut-out.

For example, the apparatus may include, wherein the at least one tip interface is coupled to the distal end of the at least one guide.

In one example, a method comprises:

providing at least one guide that is associated with at least one tip interface that is moveable between an extended position and a retracted position; and forming a shape-memory alloy actuator with a connection interface portion that includes a cut-out that receives the at least one guide, wherein the shape-memory alloy actuator moves the at least one tip interface to the retracted position in response to an electrical input.

The method may include any of the following steps either alone or in any combination thereof.

For example, the method may include, wherein the cut-out is non-circular in shape (e.g. cut-out profile varies dimensionally about the linear axis of motion).

For example, the method may include, wherein the cut-out is defined by a variable profile.

For example, the method may include, wherein the cut-out comprises a plurality of discrete cut-outs.

For example, the method may include associating at least one discrete cut-out with the at least one guide, and associating at least one discrete cut-out with the at least one tip interface.

For example, the method may include, wherein the shape-memory alloy actuator comprises a center pad portion and first and second legs on opposing sides of the center pad portion, and wherein each of the first and second legs extend to a distal end comprising a connector pad, the method including forming the cut-out in the center pad portion.

For example, the method may include forming the cut-out as one or more first cut-outs that receive corresponding protrusions on the at least one guide, and further forming one or more second cut-outs that receive corresponding protrusions on the at least tip interface.

For example, the method may include sandwiching the center pad portion between the at least tip interface and the at least one guide.

For example, the method may include defining the cut-out with a variable profile, and moving the at least one guide along a single axis of motion, the at least one guide including a distal end that extends through the cut-out.

For example, the method may include coupling the at least one tip interface to the distal end of the at least one guide.

V. In one example, the subject disclosure provides a method and apparatus that includes a guide sleeve that surrounds a guide and supports the shape-memory alloy actuator. In one example, the apparatus comprises:

a guide sleeve comprising an internal cavity that defines a single axis of motion along a guide path;

at least one guide at least partially received within the guide sleeve and movable along the guide path;

at least one tip interface associated with the at least one guide, the at least one tip interface moveable between an extended position and a retracted position;

a resilient member biasing the at least one tip interface to the extended position, the resilient member received within the internal cavity; and a shape-memory alloy actuator that moves the at least one tip interface to the retracted position in response to an electrical input, wherein movement of the shape-memory alloy actuator is maintained along the single axis of motion as the at least one guide moves along the guide path within the guide sleeve.

The apparatus may include any of the following features either alone or in any combination thereof.

For example, the apparatus may include, wherein the resilient member is completely enclosed within the guide sleeve between an inner surface of the guide sleeve and an outer surface of the at least one guide.

For example, the apparatus may include, wherein an opening in an end of the guide sleeve that receives the at least one guide is defined by a variable profile.

For example, the apparatus may include, wherein the variable profile comprises inwardly extending ribs or splines that prevent the at least one guide from rotating within the guide sleeve.

For example, the apparatus may include, wherein the variable profile provides an open fluid flow path along an outer surface of the at least one guide.

For example, the apparatus may include, wherein the internal cavity comprises a least a first portion defined by a first dimension and a second portion defined by a second dimension that is greater than the first dimension, and wherein a first guide portion of the at least one guide is defined by an outer dimension that closely matches the first dimension, and wherein the first guide portion is also located in the second portion of the internal cavity such that an open area is created for the resilient member.

For example, the apparatus may include, wherein the at least one guide includes an enlarged portion comprising an outer dimension that closely matches the second dimension of the second portion of the cavity, and wherein the enlarged portion extends outwardly of an opening at one end of the sleeve.

For example, the apparatus may include, wherein the at least one guide includes a narrowing neck portion that transitions between the enlarged portion and a distal end portion of the at least one guide, and which is defined by an outer dimension that is less than an outer dimension of the enlarged portion and greater than an outer dimension of the narrowing neck portion, and wherein the distal end portion is captured within an internal cavity of the at least one tip interface.

For example, the apparatus may include, wherein the shape-memory alloy actuator comprises:

a center pad portion;

first and second legs on opposing sides of the center pad portion, wherein each of the first and second legs extend to a distal end comprising a connector pad; and at least one electrical connector on each connector pad.

For example, the apparatus may include, wherein the guide sleeve includes extension arms extending outwardly from opposing sides of the guide sleeve, and wherein each connector pad includes a cut-out that receives one of the extension arms.

For example, the apparatus may include, wherein the at least one electrical connector on each connector pad comprises a press-fit to a circuit board.

In one example, a method comprises:

providing a guide sleeve comprising an internal cavity that defines a single axis of motion along a guide path;

installing at least one guide at least partially within the guide sleeve to move along the guide path;

associating at least one tip interface with the at least one guide such that the at least one tip interface is moveable between an extended position and a retracted position;

biasing the at least one tip interface to the extended position with a resilient member that is positioned within the internal cavity;

moving the at least one tip interface to the retracted position with a shape-memory alloy actuator that is responsive to an electrical input; and guiding the at least one guide along the guide path to maintain movement of the shape-memory alloy actuator along the single axis of motion.

The method may include any of the following steps either alone or in any combination thereof.

For example, the method may include completely enclosing the resilient member within the guide sleeve between an inner surface of the guide sleeve and an outer surface of the at least one guide.

For example, the method may include defining an opening in an end of the guide sleeve that receives the at least one guide with a variable profile.

For example, the method may include providing the variable profile with inwardly extending ribs or splines that prevent the at least one guide from rotating within the guide sleeve.

For example, the method may include, wherein the variable profile provides an open fluid flow path along an outer surface of the at least one guide.

For example, the method may include, wherein the internal cavity comprises a least a first portion defined by a first dimension and a second portion defined by a second dimension that is greater than the first dimension, and including forming a first guide portion of the at least one guide to be defined by an outer dimension that closely matches the first dimension, and including locating the first guide portion in the second portion of the internal cavity such that an open area is created for the resilient member.

For example, the method may include:

forming the at least one guide with an enlarged portion comprising an outer dimension that closely matches the second dimension of the second portion of the internal cavity, and wherein the enlarged portion extends outwardly of an opening at one end of the sleeve;

forming the at least one guide with a narrowing neck portion that transitions between the enlarged portion and a distal end portion of the at least one guide, and which is defined by an outer dimension that is less than an outer dimension of the enlarged portion and greater than an outer dimension of the narrowing neck portion; and capturing the distal end portion within an internal cavity of the at least one tip interface.

For example, the method may include, wherein the shape-memory alloy actuator comprises a center pad portion and first and second legs on opposing sides of the center pad portion, wherein each of the first and second legs extend to a distal end comprising a connector pad, and at least one electrical connector on each connector pad, the method including:

providing extension arms extending outwardly from opposing sides of the guide sleeve;

forming a cut-out in each connector pad;

supporting each extension arm in a corresponding cut in each connector pad.

For example, the method may include press-fitting the at least one electrical connector on each connector pad into a circuit board.

VI. In one example, the subject disclosure provides a method and apparatus where the shape-memory alloy actuator comprises a non-uniform shape. In one example, an apparatus comprises:

at least one tip interface moveable along a single axis of motion between an extended position and a retracted position; and a shape-memory alloy actuator that moves the at least one tip interface to the retracted position in response to an electrical input, the shape-memory alloy actuator comprising a variable shape in a direction along the single axis of motion.

The apparatus may include any of the following features either alone or in any combination thereof.

For example, the apparatus may include, wherein the shape-memory alloy actuator comprises a body with a pad portion that is connectable to the at least one tip interface, the body extending to a distal end that includes at least one electrical connection interface, and wherein the body comprises a variable shape from the pad portion to the distal end.

For example, the apparatus may include, wherein the variable shape comprises an accordion shape with an increasing or decreasing amplitude.

For example, the apparatus may include, wherein the variable shape comprises an accordion shape with an increasing and decreasing amplitude.

For example, the apparatus may include, wherein the variable shape comprises an accordion shape with an increasing or decreasing pitch.

For example, the apparatus may include, wherein the variable shape comprises ring-shaped segments that increase in diameter.

For example, the apparatus may include, wherein the distal end comprises a connector pad with at least one electrical connector that provides the at least one electrical connection interface, and wherein an outer dimension of the body in a direction non-parallel to the single axis of motion is greater than an outer dimension of the connector pad.

For example, the apparatus may include a transition portion connecting the pad portion to the body, wherein the transition portion comprises a variable outer dimension in a direction non-parallel to the single axis of motion.

For example, the apparatus may include a transition portion connecting the connector pad to the body, wherein the transition portion comprises a variable outer dimension in a direction non-parallel to the single axis of motion.

For example, the apparatus may include, wherein the body comprises cut-outs formed in a pattern.

For example, the apparatus may include, wherein the body comprises a mesh material.

In one example, a method comprises:

providing a shape-memory alloy actuator with a variable shape in a direction along an axis of motion; and moving at least one tip interface via the shape-memory alloy actuator along the axis of motion from an extended position to a retracted position in response to an electrical input.

The method may include any of the following steps either alone or in any combination thereof.

For example, the method may include, wherein the shape-memory alloy actuator comprises a body with a pad portion that is connectable to the at least one tip interface, the body extending to a distal end that includes at least one electrical connection interface, the method including: forming the body with a variable shape extending from the pad portion to the distal end.

For example, the method may include forming the variable shape as an accordion shape with an increasing or decreasing amplitude.

For example, the method may include forming the variable shape as an accordion shape with an increasing and decreasing amplitude.

For example, the method may include forming the variable shape as an accordion shape with an increasing or decreasing pitch.

For example, the method may include forming the variable shape as ring-shaped segments that increase in diameter.

For example, the method may include, wherein the distal end comprises a connector pad with at least one electrical connector that provides the at least one electrical connection interface, the including: forming an outer dimension of the body to be greater than an outer dimension of the connector pad in a direction non-parallel to the single axis of motion.

For example, the method may include:

providing a transition portion connecting the pad portion to the body, wherein the transition portion comprises a variable outer dimension in a direction non-parallel to the single axis of motion; or providing a transition portion connecting the connector pad to the body, wherein the transition portion comprises a variable outer dimension in a direction non-parallel to the single axis of motion.

For example, the method may include, wherein the body comprises cut-outs formed in a pattern or wherein the body comprises a mesh material.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An apparatus comprising:

at least one guide movable along a single axis of motion;

at least one tip interface associated with the at least one guide, the at least one tip interface moveable between a first position and a second position;

a resilient member biasing the at least one tip interface to one of the first position and the second position;

a shape-memory alloy actuator that moves the at least one tip interface to the other of the first position and second position in response to an electrical input, the shape-memory alloy actuator including at least one electrical connector, wherein the shape-memory alloy actuator comprises at least one center pad portion coupled to the at least one guide and the at least one tip interface at a connection interface; and at least one circuit board connected to the at least one electrical connector, wherein the single axis of motion extends non-perpendicular to a planar surface of the at least one circuit board.

2. The apparatus of claim 1, wherein:

the at least one guide comprises a single guide;

the at least one tip interface comprises a single tip interface coupled to one end of the single guide at the connection interface; and the at least one center pad portion is coupled to the single guide and the single tip interface at the connection interface.

3. The apparatus of claim 2, wherein:

the resilient member surrounds at least a portion of the single guide and includes a first end moveable with the single guide and a second end seated on a fixed spring support.

4. The apparatus of claim 1, wherein:

the at least one guide comprises a single guide;

the at least one tip interface comprises a first tip interface that is coupled to one end of the single guide at a first connection interface and a second tip interface that is coupled to an opposite end of the single guide at a second connection interface; and the at least one center pad portion is coupled to the single guide and to the first tip interface at the first connection interface, wherein the first connection interface is the connection interface.

5. The apparatus of claim 4, wherein:

the resilient member completely surrounds at least a portion of the single guide from one end of the single guide to an opposite end of the single guide, and wherein the resilient member includes a first end moveable with the single guide and a second end seated on a fixed spring support.

6. The apparatus of claim 1, wherein:

the at least one guide comprises a first guide and a second guide;

the connection interface comprises a first connection interface and a second connection interface;

the at least one tip interface comprises a first tip interface that is coupled to one end of the first guide at the first connection interface and a second tip interface that is coupled to one end of the second guide at the second connection interface; and the shape-memory alloy actuator comprises a first actuator and a second actuator, the at least one center pad portion comprises a first center pad portion and a second center pad portion, the first center pad portion corresponds to the first actuator and the second center pad portion corresponds to the second actuator, the first center pad portion is coupled to the first guide and the first tip interface at the first connection interface, and the second center pad portion is coupled to the second guide and the second tip interface at the second connection interface.

7. The apparatus of claim 6, wherein:

a first end of the resilient member surrounds at least a portion of the first guide and a second end of the resilient member surrounds at least a portion of the second guide; and the first end is moveable with the first guide and the second end is moveable with the second guide.

8. The apparatus of claim 1, wherein the at least one electrical connector extends toward the at least one circuit board in a direction that is non-parallel to the single axis of motion.

9. The apparatus of claim 1, wherein the shape-memory alloy actuator comprises:

first and second accordion legs on opposing sides of the at least one center pad portion, wherein each of the first and second accordion legs extend to a distal end comprising a connector pad; and wherein the at least one center pad portion is associated with the at least one guide and each connector pad includes at least one electrical connector to connect to the at least one circuit board.

10. The apparatus of claim 1, wherein the at least one tip interface interacts with one or more fluid bladders for a seat.

11. The apparatus of claim 1, wherein the shape-memory alloy actuator comprises a body portion extending between two connection portions that each include at least one electrical connector, and wherein the body portion and connection portions are formed as a single piece of material comprising cut edges.

12. The apparatus of claim 1, including a guide sleeve that receives the at least one guide, and wherein the resilient member is positioned within a cavity formed between an inner surface of the guide sleeve and an outer surface of the at least one guide.

13. The apparatus of claim 12, wherein the guide sleeve includes one or more protrusions that prevent rotation of the at least one guide within the guide sleeve.

14. A method comprising:

providing at least one tip interface associated with at least one guide, the at least one tip interface moveable between a first position and second position along a single axis of motion;

biasing the at least one tip interface to one of the first position and the second position;

moving the at least one tip interface to the other of the first position and second position via a shape-memory alloy actuator that is responsive to an electrical input, wherein the shape-memory alloy actuator comprises at least one center pad portion coupled to the at least one guide and the at least one tip interface at a connection interface; and connecting at least one circuit board to at least one electrical connector of the shape-memory alloy actuator such that the single axis of motion extends non-perpendicular to a planar surface of the at least one circuit board.

15. The method of claim 14, including laser cutting the shape-memory alloy actuator from a single sheet of material such that the shape-memory alloy actuator comprises a single body extending between two connection portions that each include at least one electrical connector.

16. The method of claim 14, including:

selecting one or more guides, one or more tip interfaces, one or more shape-memory alloy actuators, and the at least one circuit board in different configurations to provide a plurality of actuator variants; and providing a resilient member as a single spring that is used for each variant.

17. The method of claim 14, including associating the at least one tip interface with one or more fluid bladders in a seat.

18. The method of claim 14, wherein the at least one guide comprises a single guide, and the at least one tip interface comprises a single tip interface that is coupled to one end of the single guide at the connection interface, the method including:

coupling the at least one center pad portion to the single guide and the single tip interface at the connection interface;

surrounding at least a portion of the single guide with a resilient member; and mounting a first spring end to the single guide and seating a second spring end on a fixed spring support.

19. The method of claim 14, wherein the at least one guide comprises a single guide, the at least one tip interface comprises a first tip interface that is coupled to one end of the single guide at a first connection interface and a second tip interface that is coupled to an opposite end of the single guide at a second connection interface, the method including:

coupling the at least one center pad portion to the single guide and to one of the first tip interface at the first connection interface, wherein the first connection interface is the connection interface;

surrounding at least a portion of the single guide with a resilient member; and mounting a first end of the resilient member to the single guide and seating a second end of the resilient member on a fixed spring support.

20. The method of claim 14, wherein the at least one guide comprises a first guide and a second guide, the connection interface comprises a first connection interface and a second connection interface, the at least one tip interface comprises a first tip interface that is coupled to one end of the first guide at the first connection interface and a second tip interface that is coupled to one end of the second guide at the second connection interface, and the shape-memory alloy actuator comprises a first actuator and a second actuator, the at least one center pad portion comprises a first center pad portion corresponding to the first actuator and a second center pad portion corresponding to the second actuator, the method including:

coupling the first guide and the first tip interface to the first center pad portion at the first connection interface;

coupling the second guide and the second tip interface to the second center pad portion at the second connection interface;

surrounding at least a portion of the first guide with a first end of a resilient member; and surrounding at least a portion of the second guide with a second end of the resilient member, wherein the first end is moveable with the first guide and the second end is moveable with the second guide.

* * * * *